United States Patent
Grocutt

(10) Patent No.: US 10,963,251 B2
(45) Date of Patent: Mar. 30, 2021

(54) VECTOR REGISTER ACCESS

(71) Applicant: ARM LIMITED, Cambridge (GB)

(72) Inventor: Thomas Christopher Grocutt, Cambridge (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 16/314,882

(22) PCT Filed: Jun. 15, 2017

(86) PCT No.: PCT/GB2017/051752
§ 371 (c)(1),
(2) Date: Jan. 3, 2019

(87) PCT Pub. No.: WO2018/007784
PCT Pub. Date: Jan. 11, 2018

(65) Prior Publication Data
US 2019/0250914 A1    Aug. 15, 2019

(30) Foreign Application Priority Data
Jul. 8, 2016 (GB) ...................................... 1611946

(51) Int. Cl.
*G06F 9/312* (2018.01)
*G06F 9/345* (2018.01)
(Continued)

(52) U.S. Cl.
CPC .......... *G06F 9/3013* (2013.01); *G06F 9/3004* (2013.01); *G06F 9/3012* (2013.01);
(Continued)

(58) Field of Classification Search
CPC ............... G06F 9/3013; G06F 9/30036; G06F 9/30105; G06F 9/3455; G06F 9/3012;
(Continued)

(56) References Cited

U.S. PATENT DOCUMENTS 4,633,389 A * 12/1986 Tanaka .................. G06F 9/3885
712/4
5,019,968 A * 5/1991 Wang .................. G06F 9/30032
708/520
(Continued)

FOREIGN PATENT DOCUMENTS

| EP | 1 586 991 | 10/2005 |
|---|---|---|
| EP | 1 692 613 | 8/2006 |

(Continued)

OTHER PUBLICATIONS

Merriam-Webster Dictionary, www.merriam-webster.com/dictionary/manufacture,© 2020 Merriam-Webster, Incorporated (Year: 2020).*
(Continued)

*Primary Examiner* — Daniel H Pan
(74) *Attorney, Agent, or Firm* — Nixon & Vanderhye, P.C.

(57) ABSTRACT

There is provided an apparatus that includes a set of vector registers, each of the vector registers being arranged to store a vector comprising a plurality of portions. The set of vector registers is logically divided into a plurality of columns, each of the columns being arranged to store a same portion of each vector. The apparatus also includes register access circuitry that comprises a plurality of access blocks. Each access block is arranged to access a portion in a different column when accessing one of the vector registers than when accessing at least one other of the vector registers. The register access circuitry is arranged to simultaneously access portions in any one of: the vector registers and the columns.

19 Claims, 27 Drawing Sheets

(51) Int. Cl.
  *G06F 15/80* (2006.01)
  *G06F 17/16* (2006.01)
  *G06F 9/30* (2018.01)

(52) U.S. Cl.
  CPC ...... *G06F 9/30032* (2013.01); *G06F 9/30036* (2013.01); *G06F 9/30043* (2013.01); *G06F 9/30105* (2013.01); *G06F 9/30145* (2013.01); *G06F 9/345* (2013.01); *G06F 9/3455* (2013.01); *G06F 15/8053* (2013.01); *G06F 17/16* (2013.01)

(58) Field of Classification Search
  CPC ............ G06F 9/30141; G06F 9/3001; G06F 9/30025; G06F 9/30029; G06F 9/30032; G06F 15/8053; G06F 15/8061; G06F 15/8076; G06F 15/8084; G06F 15/8092; G06F 16/2237; G06F 17/16; G06F 2212/301; G06F 2212/454; G06F 7/483; G06F 7/4806; G06F 5/16; G06F 9/345; G06F 9/3004; G06F 9/30043; G06F 9/30145; G06F 7/78; G06F 7/5443
  USPC ................ 712/2–22, 221–225; 708/514, 520
  See application file for complete search history.

(56) References Cited

U.S. PATENT DOCUMENTS

| | | | |
|---|---|---|---|
| 5,887,183 | A | 3/1999 | Agarwal et al. |
| 6,573,846 | B1* | 6/2003 | Trivedi ............ G06F 9/3004 341/67 |
| 7,337,205 | B2* | 2/2008 | Sazegari ............ G06F 17/16 708/607 |
| 9,952,831 | B1* | 4/2018 | Ross ............ G06F 7/768 |
| 2002/0198911 | A1 | 12/2002 | Blomgren |
| 2005/0108503 | A1 | 5/2005 | Sandon et al. |
| 2008/0098200 | A1* | 4/2008 | Sandon ............ G06F 9/3012 712/1 |
| 2010/0106759 | A1 | 4/2010 | Chen et al. |
| 2010/0106944 | A1 | 4/2010 | Chen |
| 2010/0313060 | A1* | 12/2010 | Bjorklund ........... G06F 9/30032 713/600 |
| 2011/0072236 | A1* | 3/2011 | Mimar ................ G06F 9/30109 712/4 |
| 2011/0087859 | A1 | 4/2011 | Mimar |
| 2013/0073599 | A1* | 3/2013 | Maloney ............... G06F 9/3001 708/514 |
| 2014/0181464 | A1 | 6/2014 | Forsyth et al. |
| 2016/0188334 | A1 | 6/2016 | Lee et al. |

FOREIGN PATENT DOCUMENTS

| | | |
|---|---|---|
| EP | 2 950 202 | 12/2015 |
| WO | WO 2005/057406 A1 | 6/2005 |
| WO | 2010/139944 | 12/2010 |
| WO | 2014/108749 | 7/2014 |

OTHER PUBLICATIONS

Office Action in related U.S. Appl. No. 16/314,936 dated May 28, 2020, 23 pages.
U.S. Appl. No. 16/314,936, filed Jan. 3, 2019, Grocutt.
International Search Report and Written Opinion of the ISA for PCT/GB2017/051629, dated Oct. 13, 2017, 12 pages.
GB Search and Examination Report for GB1611943.0, dated Jan. 4, 2017, 7 pages.
Examination Report for GB Application No. 1611943.0 dated Feb. 22, 2019, 3 pages.
International Search Report and Written Opinion of the ISA for PCT/GB2017/051752 dated Sep. 19, 2017, 11 pages.
Combined Search and Examination Report for GB1611946.3 dated Jan. 9, 2017, 7 pages.
Examination Report for GB1611943.0 dated Dec. 11, 2018, 4 pages.
Office Action in related U.S. Appl. No. 16/314,936 dated Oct. 20, 2020.
Office Action in corresponding EP Application No. 17 732 182.5-1203 dated Oct. 19, 2020.
Official Letter and Search Report in corresponding Taiwan Application No. 106118501 dated Nov. 25, 2020 (translated).

* cited by examiner

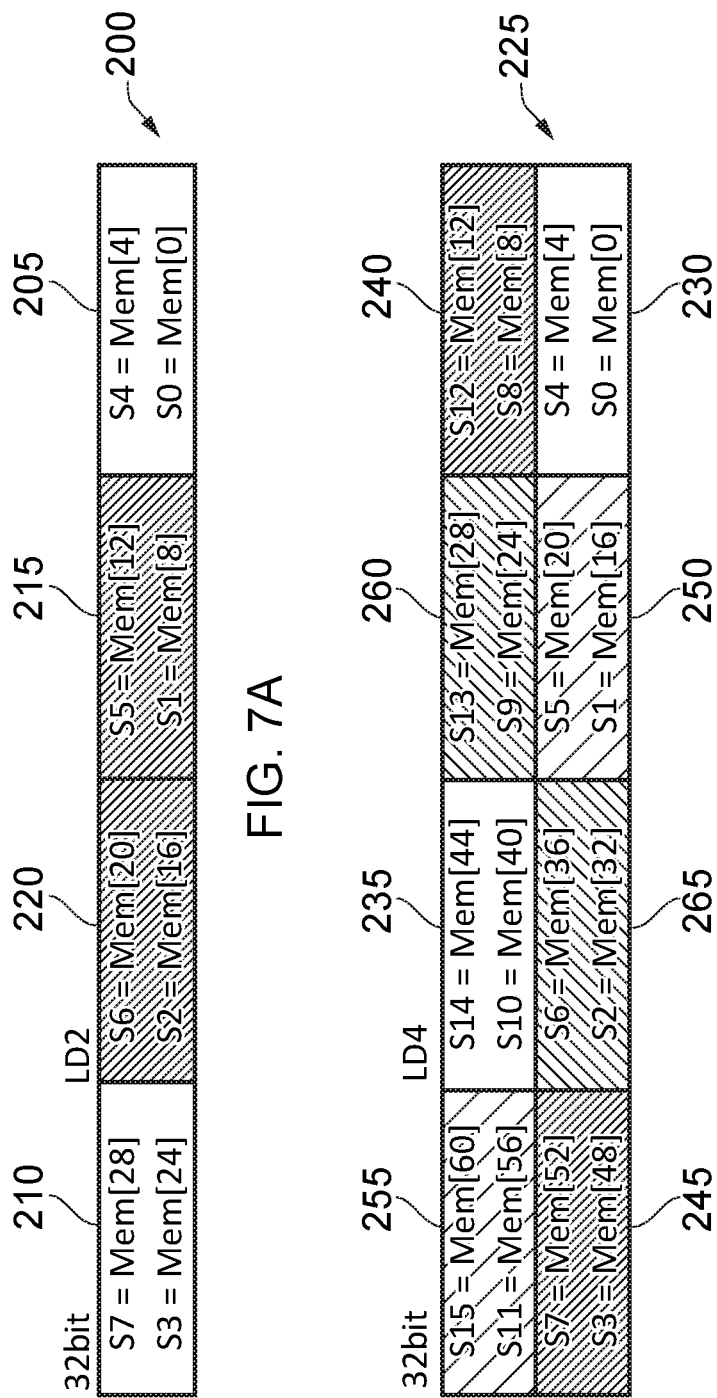

```
VLD2<pat>.<size> {Qd, Qd+1}, [Rn]
VLD2<pat>.<size> {Qd, Qd+1}, [Rn]!
```

| 15 14 13 | 12 11 10 9 8 | 7 | 6 5 4 | 3 | 2 1 0 |
|---|---|---|---|---|---|
| 111 | 1 1 0 1 | (0) | 0 W 1 | | |

| 15 14 13 12 | 11 10 9 8 | 7 | 6 5 4 | 3 2 1 0 |
|---|---|---|---|---|
| | Qd | | Rn | |

| 15 14 13 12 11 10 | 9 8 | 7 6 | 5 4 | 3 2 1 0 |
|---|---|---|---|---|
| | 1100 | size | pat | (0)(0)(0)(0) |

Non writeback: W=0
Writeback: W=1

```
VLD4<pat>.<size> {Qd, Qd+1, Qd+2, Qd+3}, [Rn]
VLD4<pat>.<size> {Qd, Qd+1, Qd+2, Qd+3}, [Rn]!
```

| 15 14 13 | 12 11 10 9 8 | 7 | 6 5 4 | 3 | 2 1 0 |
|---|---|---|---|---|---|
| 111 | 1 1 0 1 | (0) | 1 W 1 | | |

| 15 14 13 12 | 11 10 9 8 | 7 | 6 5 4 | 3 2 1 0 |
|---|---|---|---|---|
| | Qd | | Rn | |

| 15 14 13 12 11 10 | 9 8 | 7 6 | 5 4 | 3 2 1 0 |
|---|---|---|---|---|
| | 1101 | size | pat | (0)(0)(0)(0) |

Non writeback: W=0
Writeback: W=1

EXECUTION OF EACH REARRANGMENT INST^N IN GROUP

VECTOR REGISTER ACCESS

This application is the U.S. national phase of International Application No. PCT/GB2017/051752 filed Jun. 15, 2017 which designated the U.S. and claims priority to GB Patent Application No. 1611946.3 filed Jul. 8, 2016, the entire contents of each of which are hereby incorporated by reference.

The present technique relates to data processing. In particular, to the accessing of vector registers.

A vector register file contains a number of vector registers, each of which may store one or more vectors each comprising a number of portions. For example, a vector could represent a pixel colour by providing a red value, a green value, a blue value, and an alpha value, each of the values being 8 bits. In this way a number of different pixel colours could be provided in order to, for example, represent the colours of each pixel in an image. Performing processing on one vector register at a time has previously been proposed. However, it is often desirable to provide different access patterns. For example, some instructions might desire access to all of the components of a single vector at once (e.g. a single pixel's representation), whilst other instructions might desire access to a single component (e.g. an alpha value) of multiple (e.g. 4) vectors at once.

Viewed from a first example configuration, there is provided an apparatus, comprising: a set of vector registers, each of the vector registers being arranged to store a vector comprising a plurality of portions, the set of vector registers being logically divided into a plurality of columns, each of the columns being arranged to store a same portion of each vector; and register access circuitry comprising a plurality of access blocks, wherein each access block is arranged to access a portion in a different column when accessing one of the vector registers than when accessing at least one other of the vector registers; and the register access circuitry is arranged to simultaneously access portions in any one of: the vector registers and the columns.

Viewed from a second example configuration, there is provided a method of manufacturing an apparatus, the method comprising: providing a set of vector registers, each of the vector registers being arranged to store a vector comprising a plurality of portions, the set of vector registers being logically divided into a plurality of columns, each of the columns being arranged to store a same portion of each vector; and providing register access circuitry comprising a plurality of access blocks, wherein each access block is arranged to access a portion in a different column when accessing one of the vector registers than when accessing at least one other of the vector registers; and the register access circuitry is arranged to simultaneously access portions in any one of: the vector registers and the columns.

Viewed from a third example configuration, there is provided an apparatus, comprising: a set of vector register means each for storing a vector comprising a plurality of portions, the set of vector register means being logically divided into a plurality of columns, each of the columns being arranged to store a same portion of each vector; and register access means for simultaneously accessing portions in any one of: the vector register means and the columns, the register access means comprising a plurality of access block means for accessing a portion in a different column when accessing one of the vector register means than when accessing at least one other of the vector register means.

The present technique will be described further, by way of example only, with reference to embodiments thereof as illustrated in the accompanying drawings, in which:

FIG. 1 schematically illustrates an example of a data processing apparatus supporting processing of vector instructions;

FIGS. 7A to 7G illustrate different data element access patterns that can be associated with individual instructions within a group of rearrangement instructions for different sizes of data elements;

FIGS. 11A to 11D illustrate various example encodings of load and store instructions that can be provided in accordance with one embodiment;

Figure 15:
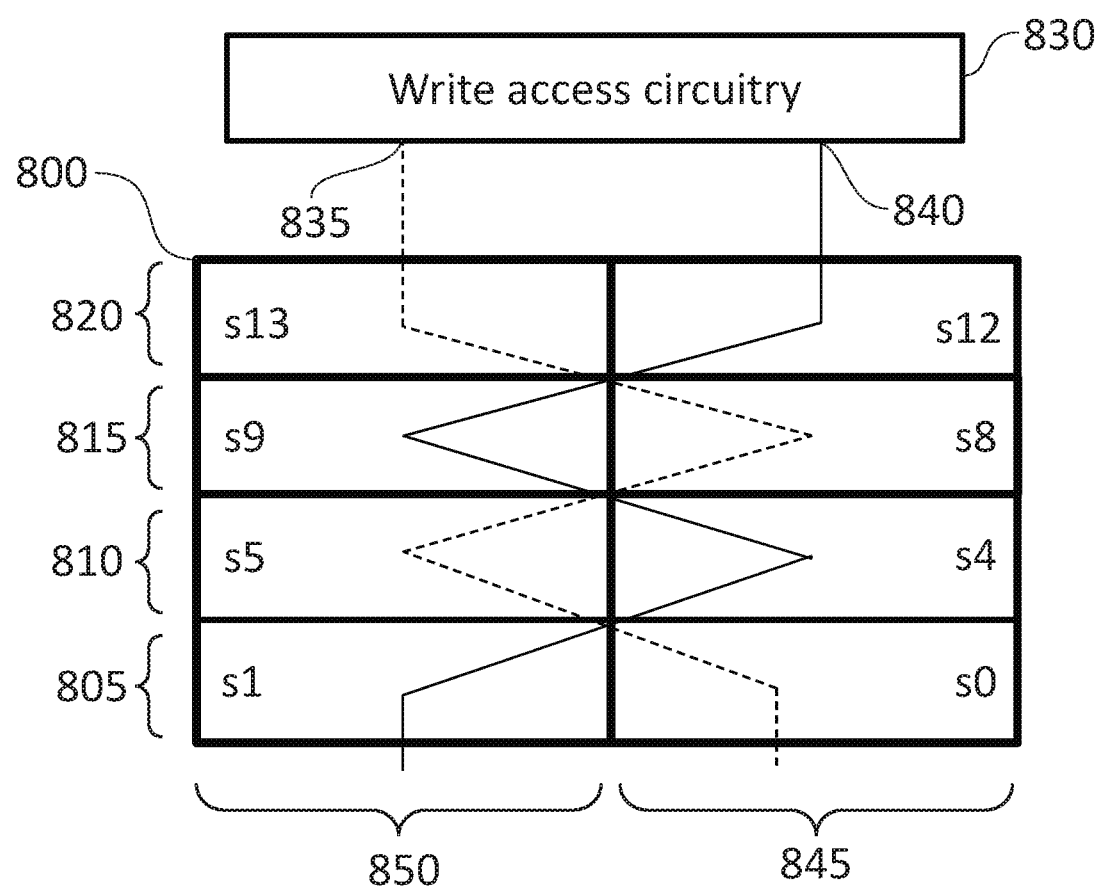
Figure 16:
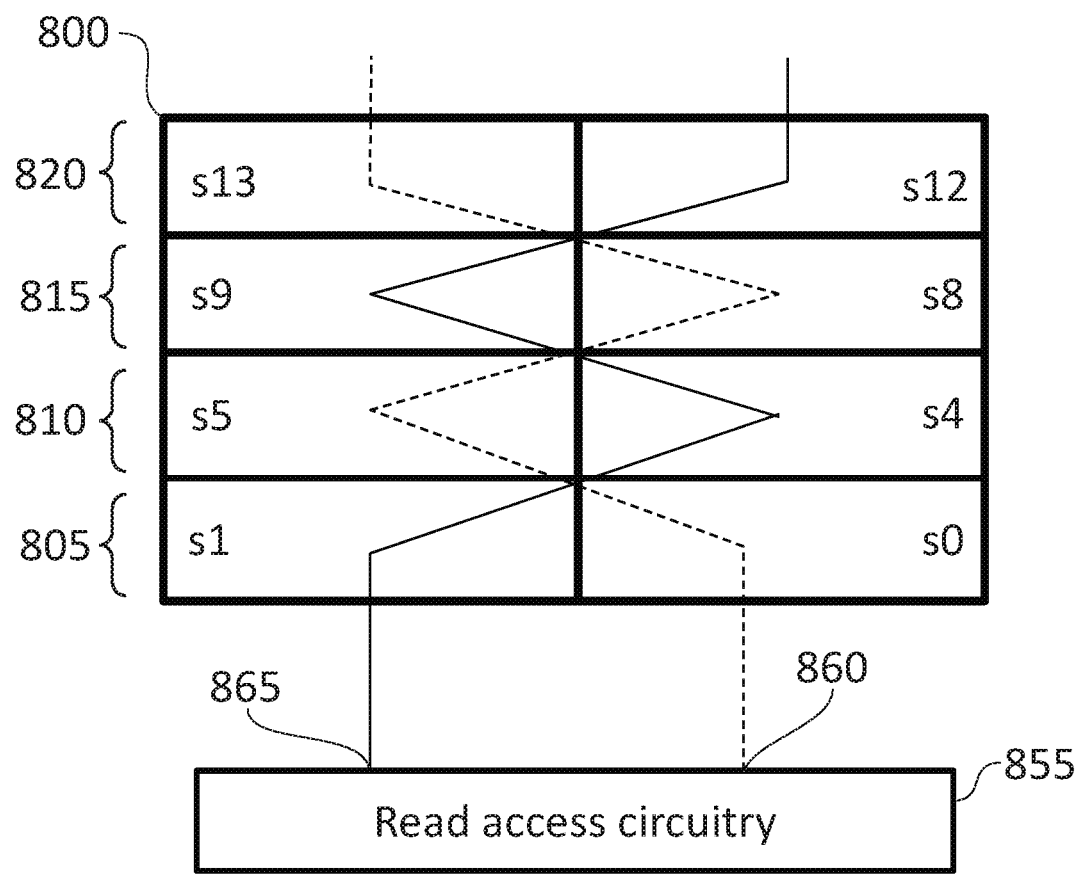
Figure 17:
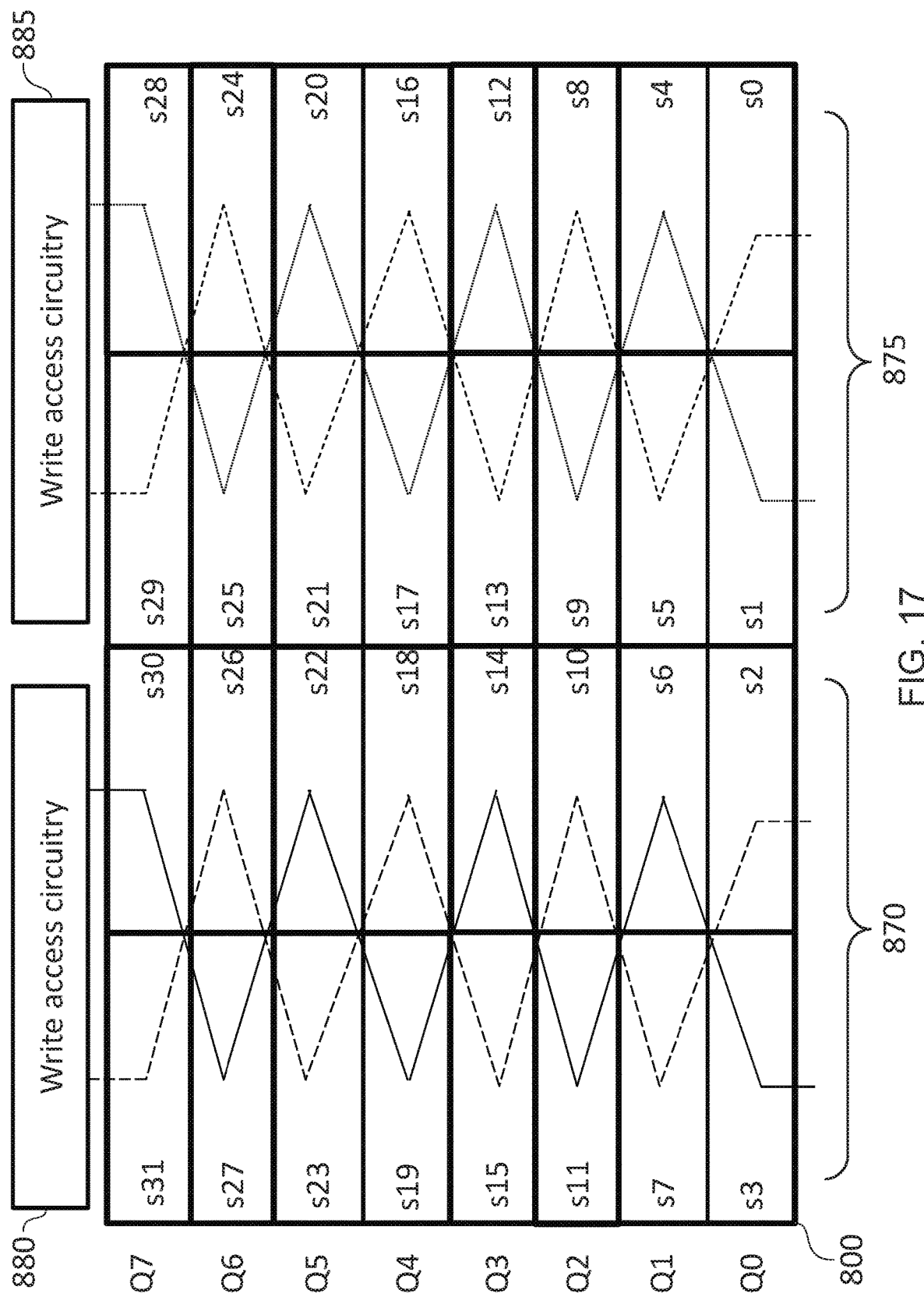
Figure 18:
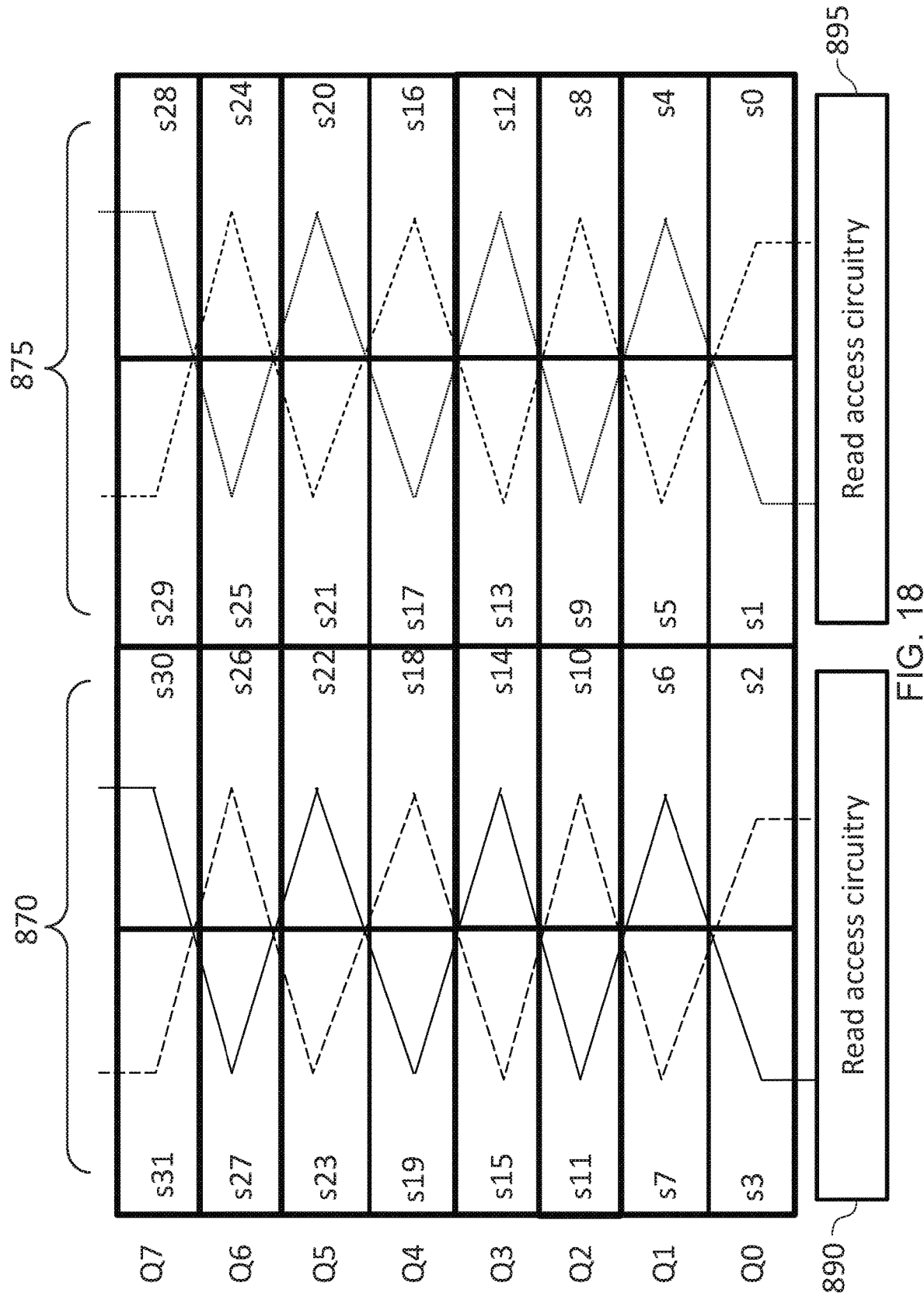
Figure 20:
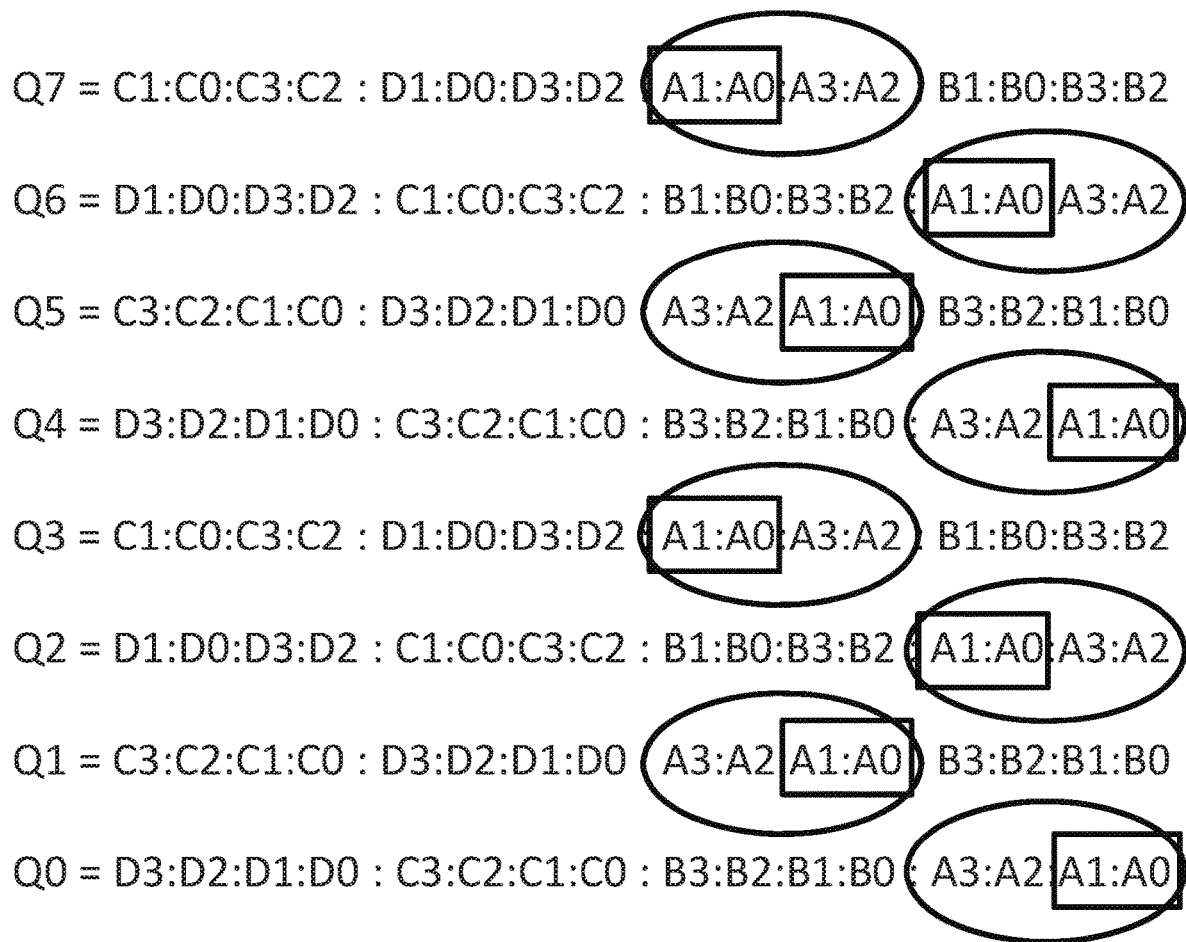
Figure 21:
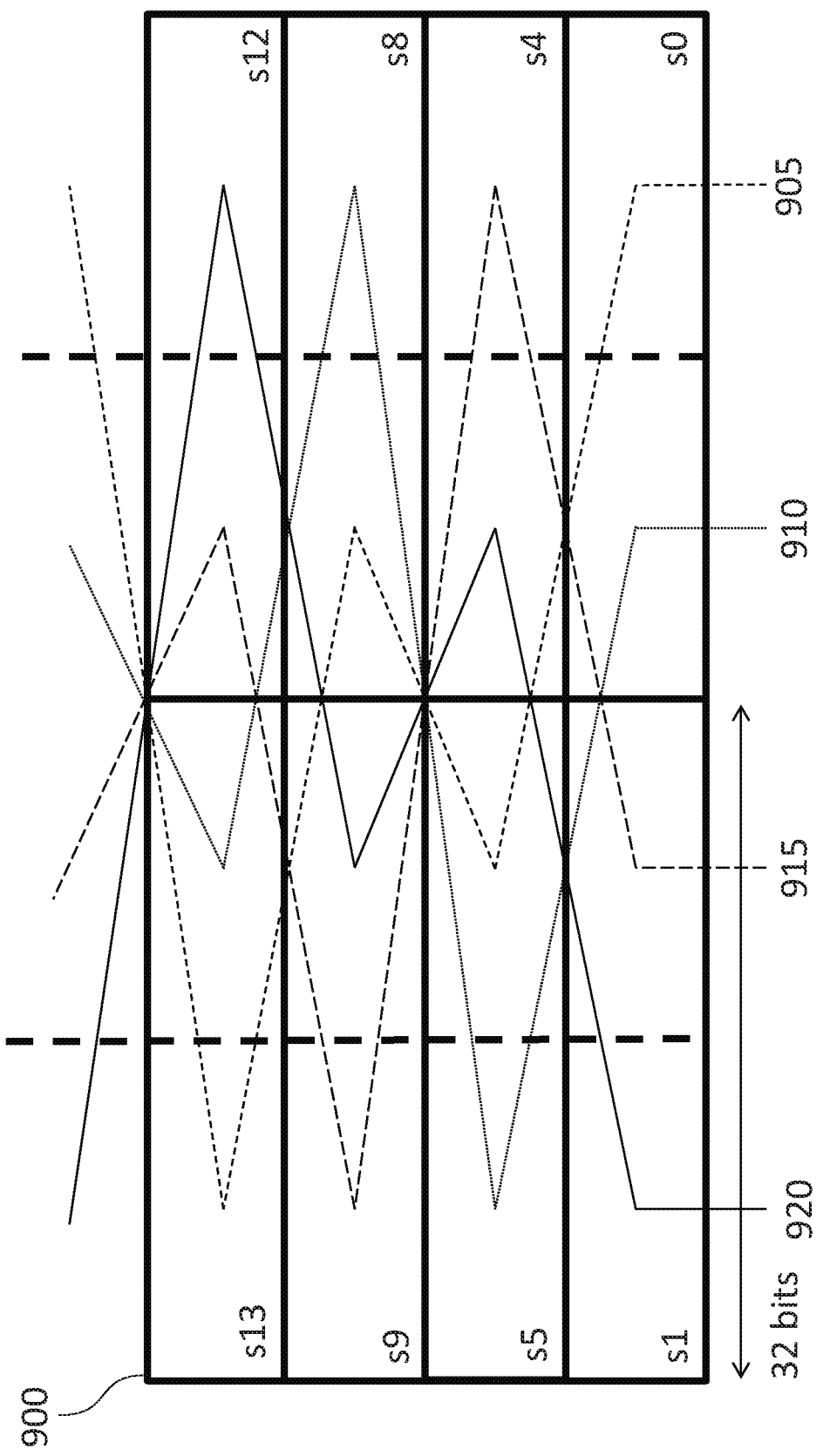
Figure 22:
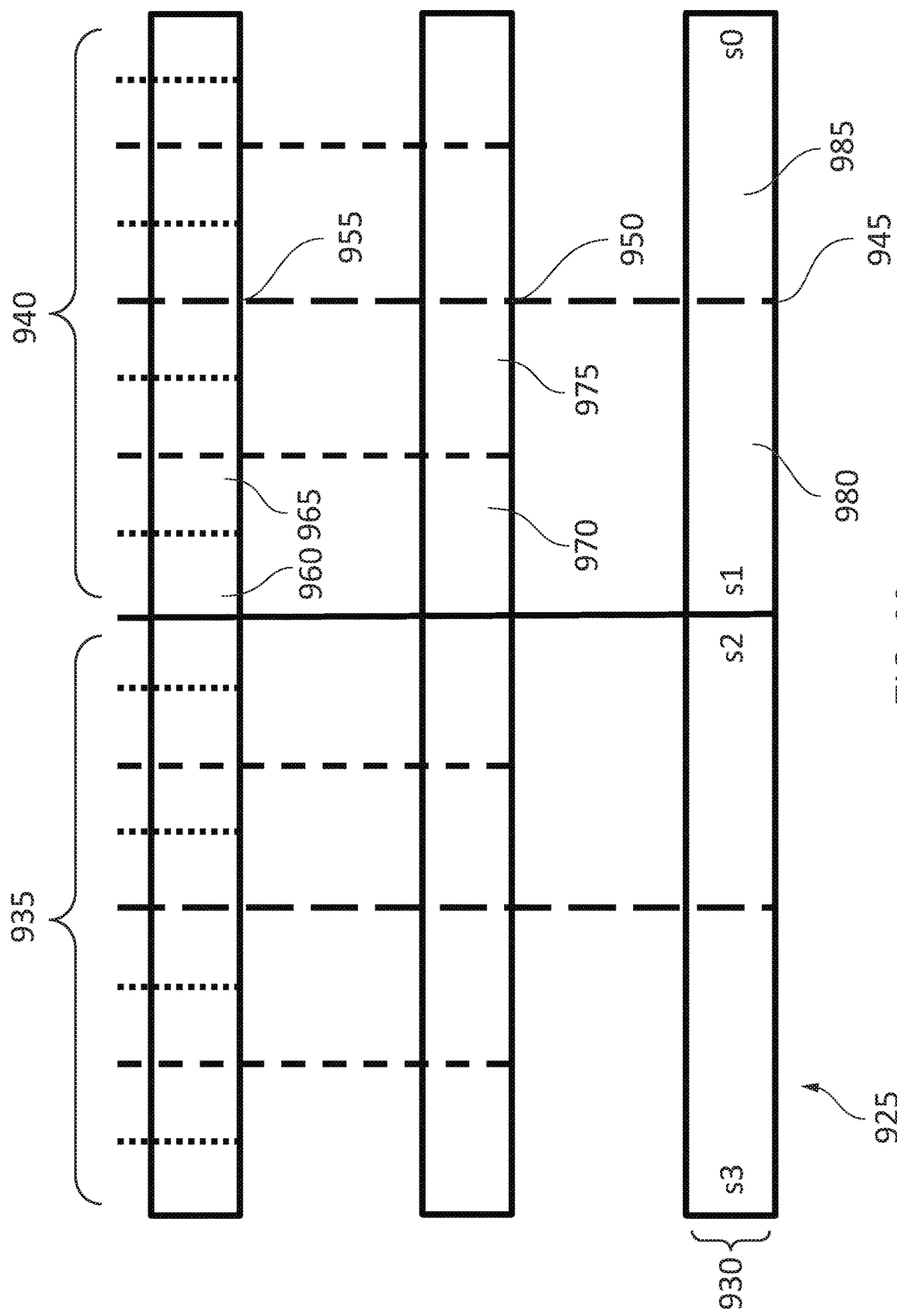
Figure 23:
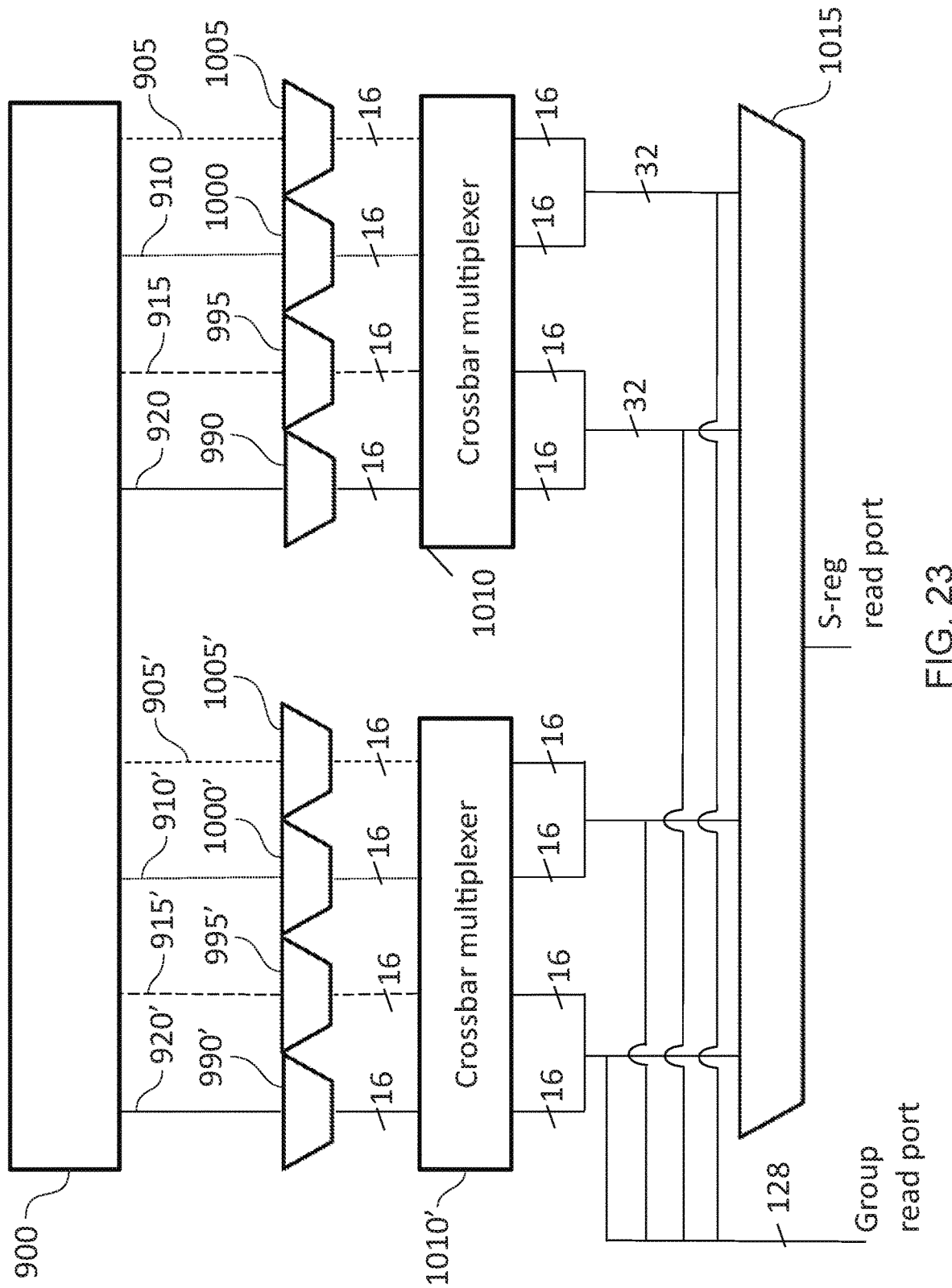
Figure 24:
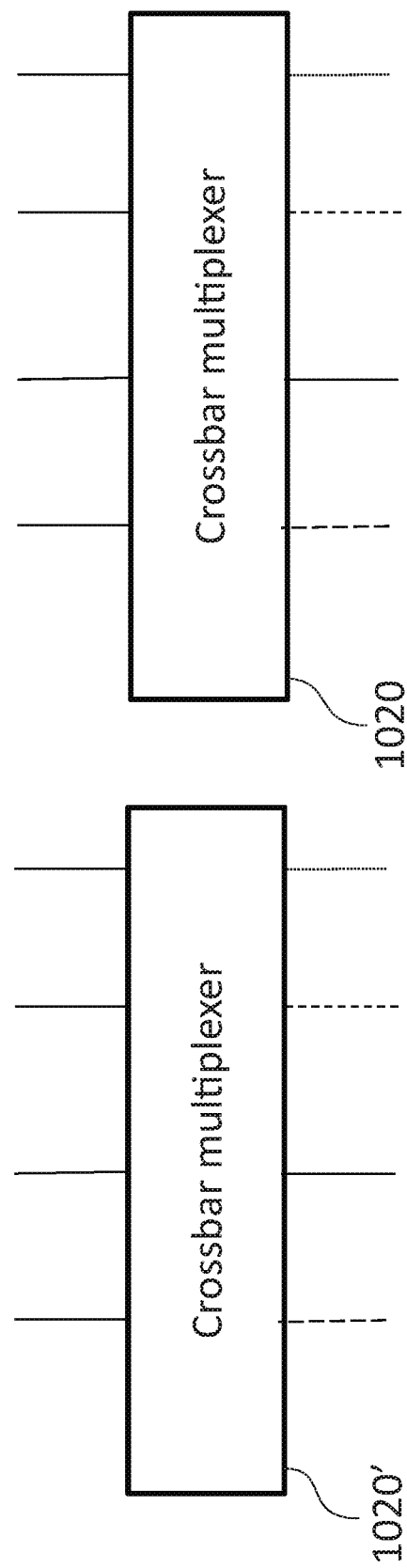
Figure 25:
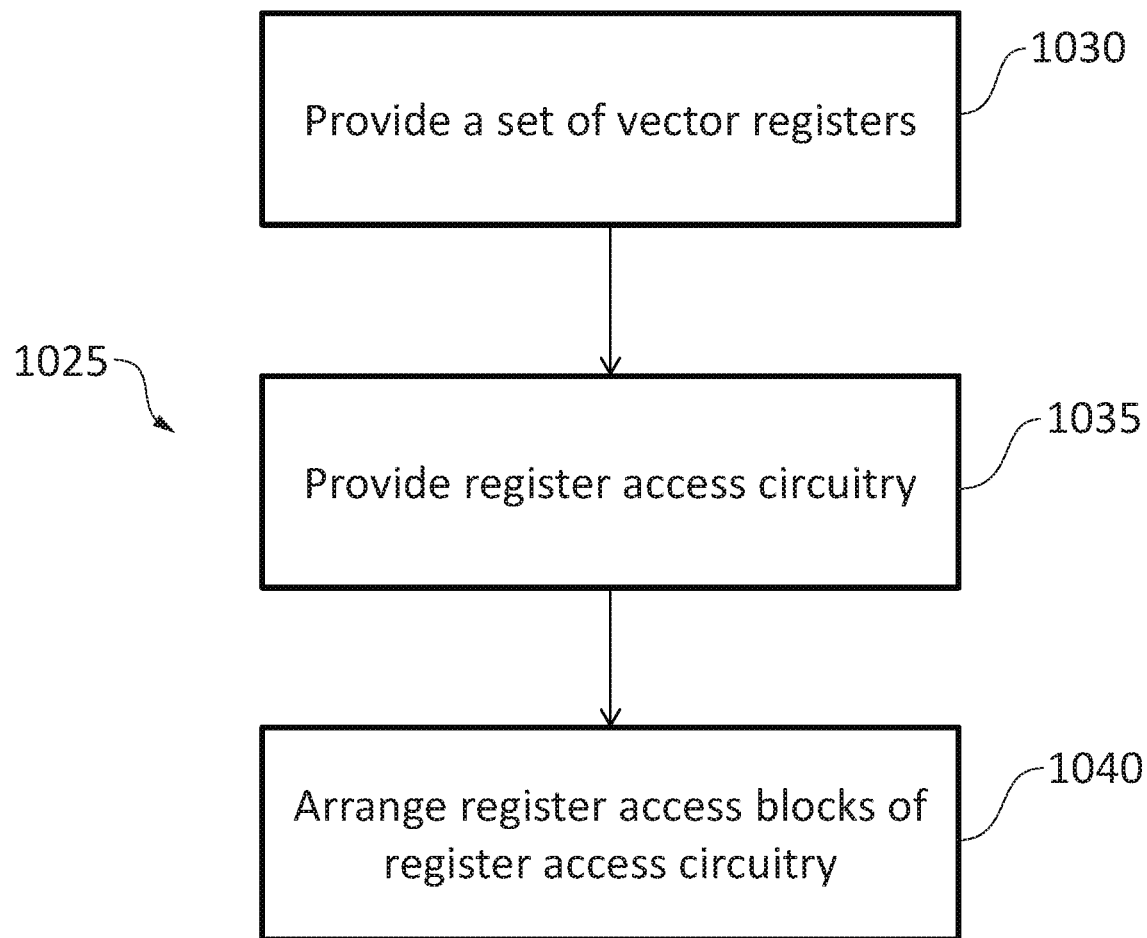
Figure 26:
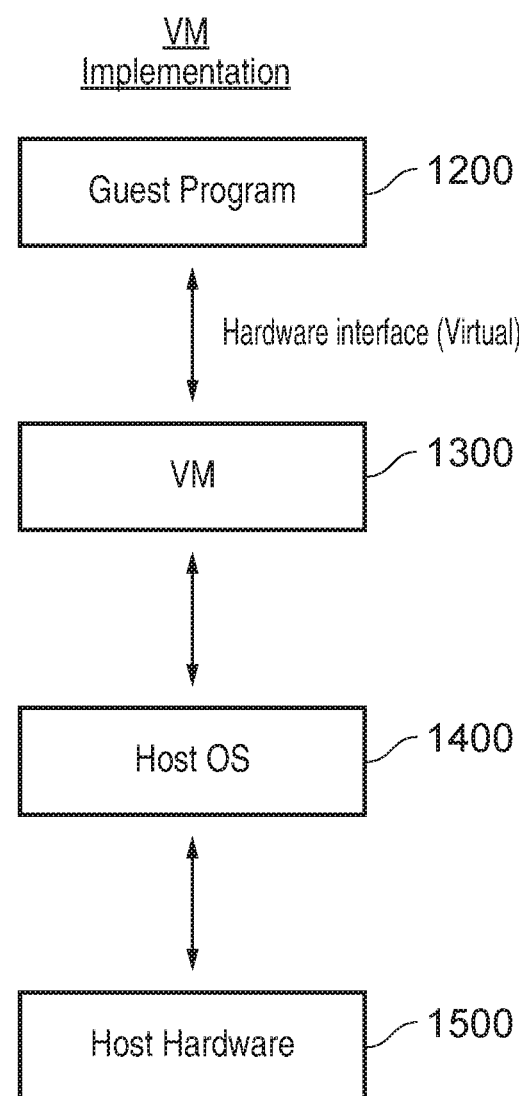

FIG. 15 schematically shows a part of a vector register file with write access circuitry in accordance with one embodiment;

FIG. 16 schematically shows a part of a vector register file with read access circuitry in accordance with one embodiment;

FIG. 17 schematically shows a vector register file with write access circuitry in accordance with one embodiment;

FIG. 18 schematically shows a vector register file with read access circuitry in accordance with one embodiment;

Figures 19A, 19B:
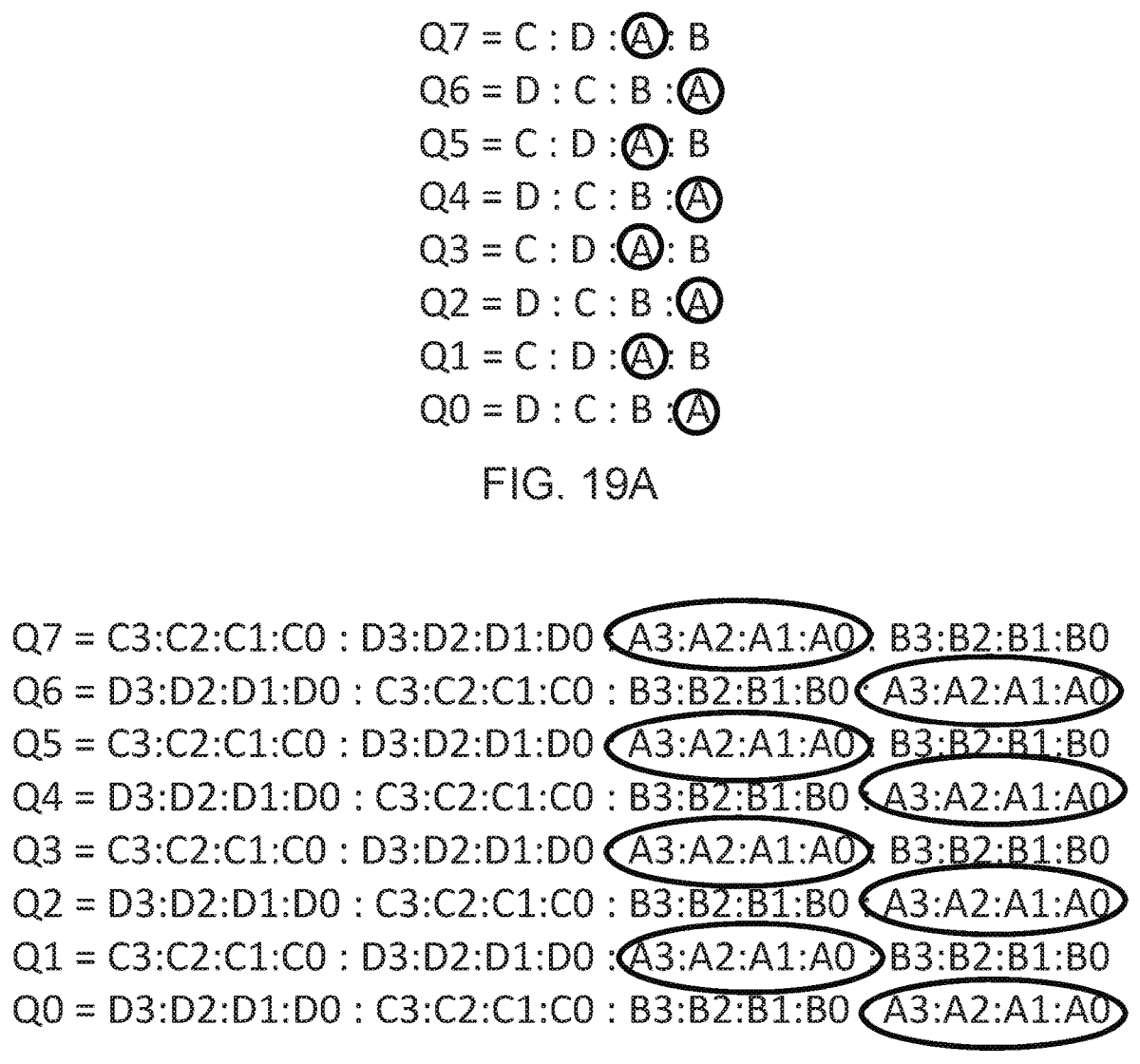

FIG. 19A illustrates an example of single twist in a vector register file where the vector register file is illustrated in textual format showing the words;

FIG. 19B illustrates an example of single twist in a vector register file where the vector register file is illustrated in textual format showing the bytes;

FIG. 20 illustrates an example of a double twist in a vector register file where the vector register file is illustrated in byte format;

FIG. 21 schematically shows one section of a vector register file in which the circuitry performs a double twist in accordance with one embodiment;

FIG. 22 is a diagram that illustrates how the process of performing a twist can be generalised to perform nested twisting an arbitrary number of times in accordance with one embodiment;

FIG. 23 schematically shows read access circuitry as an example of register access circuitry in accordance with one embodiment;

FIG. 24 schematically shows write access circuitry as an example of register access circuitry in accordance with one embodiment;

FIG. 25 is of a flow chart that illustrates a method of manufacturing in accordance with one embodiment; and FIG. 26 shows a virtual machine implementation which can be used.

Before discussing the embodiments with reference to the accompanying figures, the following description of embodiments and associated advantages is provided.

In accordance with one example configuration there is provided an apparatus, comprising: a set of vector registers, each of the vector registers being arranged to store a vector comprising a plurality of portions, the set of vector registers being logically divided into a plurality of columns, each of the columns being arranged to store a same portion of each vector; and register access circuitry comprising a plurality of access blocks, wherein each access block is arranged to access a portion in a different column when accessing one of the vector registers than when accessing at least one other of the vector registers; and the register access circuitry is arranged to simultaneously access portions in any one of: the vector registers and the columns.

The set of vector registers can be thought of as being logically (rather than necessary physically) divided into a plurality of columns, with each of the columns storing a same portion of each vector. For example, for a group of vectors, each being stored in its own 128-bit vector register, a first column might store the first 32 bits (0-31) of each of those vectors, a second column might store the second 32 bits (32-63) of each of those vectors and so on. Although it is sometimes the case that a vector register is implemented by providing a plurality of scalar registers, the columns might be of different widths to the widths of the scalar registers. The term "logically divided" is used in order to emphasise that the registers themselves need not be physically arranged in any particular manner, despite the use of terms such as "column" that might otherwise imply a physical arrangement. The register access circuitry provides access to portions of the vector registers, with the register access circuitry having a number of access blocks, each of which accesses different portions of the vector registers. Each access block is connected to access one column in one vector register and a different column in another vector register, thereby forming a "twist". In this manner, it is possible for the register access circuitry to access at least a part of a row and also to access at least a part of a column. Furthermore, regardless of which of these two forms of access is used, the portions are accessible simultaneously or substantially simultaneously in that a different portion from one of the two mentioned groups is provided at multiple ports of the register access circuitry. Accordingly, the circuitry is able to provide a number of different access patterns.

In some embodiments, the set of vector registers comprises at least one section, where each section comprises different columns; and the apparatus comprises register access circuitry for each section, each register access circuitry arranged to access portions in the section associated with that register access circuitry. The vector registers can also be logically divisible into a plurality of sections, with each of those sections being made up of multiple different columns. Register access circuitry is provided for each such section. In this way, the vector registers can be split. Such an arrangement could be used if the size of each vector is less than the capacity of each vector register. Arrangements with multiple sections can also be used to enable simultaneous access to the bottom half of one register and the top half of another vector register. This can be useful in cases where the execution of instructions that access the register file is overlapped such that the second part of a first instruction is executed simultaneously with the first part of a second instruction. Such overlapped execution can be extended such that smaller parts of a greater number of instructions are execute simultaneously.

In some embodiments, each access block is arranged to access a portion in a different column when accessing one of the vector registers than when accessing a number of other vector registers equal to the number of columns comprised within each section minus one. In these embodiments, by virtue of the increased number of columns, there is an increased number of portions. However, it remains desirable to be able to access a column of portions or a row of portions simultaneously. A more complex "twist" pattern therefore results in which, for a set of M columns, each of those columns is only accessed once in a set of M contiguous vector registers. For example, if there are four columns (or portions) in a section then each access block within that section will only access each of those columns once across vector registers 0-3.

In some embodiments, a first access block is arranged to access a first column of a first vector register and to access a second column of a second vector register; and a second access block is arranged to access the second column of the first vector register and to access the first column of the second vector register. In these embodiments, the twist associated with one of the access blocks is the opposite to the twist performed by another one of the access blocks within the same section.

In some embodiments, each section is logically divided into N columns; the N columns are logically arranged into a nested structure having $\log_2(N)$ levels, where N is greater or equal to 4 and an integer power of 2; at a first level, the N columns are split equally between a first set of at least one columns for the first level and a second set of at least one columns for the first level; each of the sets of at least one columns in each parent level is equally split again into a first set of at least one columns for a corresponding child level and a second set of at least one columns for that corresponding child level; each of the access blocks is configured, for each vector register, to visit one column, the one column being uniquely identified by the constraints of visiting, for each level, the first sets of at least one columns for half a predetermined number of vector registers before visiting the second sets of at least one columns for half a predetermined number of vector registers; and the predetermined number is equal to $2^X$, where X is different at each level and is in the range 1 to $\log_2(N)$. In such embodiments, a single twist is not sufficient to provide access to the required number of portions within a given column or a given row. For example, where 4 portions within a given row or column must be accessed simultaneously, it may be necessary to divide a section into four columns and provide a first twist nested within the second twist in, i.e. to provide the necessary array of access patterns. Indeed, this can be generally extended to a number of nested twists, thereby providing a nested structure. Within the nested structure comprising N columns (where N is greater than or equal to four and is also an integer power of two), the N columns can be logically arranged at $\log_2(N)$ levels. At a first level, all the columns are equally split in half between a first set and a second set. At each child level, e.g. each level after the first level, each of the sets of at least one columns from the parent level is equally split into a first set of at least one columns for a corresponding child level and a second set of at least one columns for that corresponding child level. In this way, a nested structure is produced, with each child level doubling the number of sets of columns as compared to its parent level. Thus all levels except the first level and the last (top) level are both child levels and parent levels to the levels directly above and below them respectively. Viewed in another way, at each lower level from the top level to the first level, sets of columns from a previous level are paired together, and hence at each lower level, the number of sets halves until all columns are divided between two halves, each having N/2 columns. With this in mind, the access pattern can then be defined. In particular, each of the access blocks is configured, for each vector register, to visit one column. The one column is uniquely identified by the constraint by which, for each level, the first sets of at least one columns for half a predetermined number of vector registers are visited before visiting the second sets of at least one columns for half the predetermined number of vector registers. Visiting M different columns therefore requires visiting at least M different vector registers.

The predetermined number is equal to $2^X$, where X is different at each level and is in the range 1 to $\log_2(N)$. So, for example, in an embodiment with 3 levels, at the second level, there are two first sets of two columns and two second sets of two columns. The two first sets of at least one columns are visited for 1, 2, or 4 vector registers before visiting the two second sets of at least one columns for a similar number of vector registers.

In some embodiments, the set of vector registers comprises 2 sections; and N has the value 4. In each of the two sections the access pattern repeats every 4 registers resulting in 2 levels of nesting of twisting.

In some embodiments, the register access circuitry comprises read access circuitry to output data elements stored in the vector registers; and the register access circuitry comprises write access circuitry to input data elements to the vector registers. In some of these embodiments, the read circuitry and the write circuitry are separated from each other and each use different connections to each other when accessing the vector registers.

In some embodiments, the read access circuitry comprises one access block for each of the plurality of columns. The number of columns is typically indicative of the number of portions that are desired to be accessed simultaneously. Each simultaneous access requires a separate access block. Hence, in some embodiments, one access block is provided per column for reading from the vector registers.

In some embodiments, the read access circuitry comprises at most one access block for each of the plurality of columns. As previously explained, the number of access blocks is indicative of the number of simultaneous accesses to rows or columns that are desired to occur at once within a given section. In some embodiments, the maximum number of simultaneous accesses is one per twist pattern. Hence, in those embodiments, there is no need to provide any more access blocks than this.

In some embodiments, the access blocks in the read access circuitry comprise multiplexers. The inputs to each multiplexer correspond with the portions to which that multiplexer is connected. The multiplexer thereby switches between the portions to which it is connected, based on a selection signal to indicate which input has been selected. Each access block is arranged to connect to portions that will not be simultaneously required. In this way, it is possible to connect the desired combinations (e.g. portions in a column or portions in a row) to different access blocks, thereby making it possible to access those portions simultaneously.

In some embodiments, the set of vector registers comprises at least one section, where each section comprises different columns; the apparatus comprises register access circuitry for each section, each register access circuitry being arranged to access portions in the section associated with that register access circuitry; and for each section the read access circuitry comprises rearrangement circuitry to rearrange outputs from each of the access blocks in the read access circuitry. In some embodiments, by connecting the access blocks in the manner described, the order in which some of the portions are output could be incorrect. Typically, the order will be such that some pairs of portions are swapped around. In order to correct for this, rearrangement circuitry can be provided to re-order the access blocks.

There are a number of different options for what rearrangement circuitry could be provided. However, in some embodiments, the rearrangement circuitry is a crossbar multiplexer. Often, such a multiplexer could be provided anyway in order to deal with endian swaps on load instructions, as well as for complex ADD/MUL instructions that need to swap the Real/Imaginary components that are interleaved in the vector registers. Hence, the use of such a multiplexer may not add to the overall circuit size.

In some embodiments, the write access circuitry comprises one access block for each of the plurality of columns. As with the read access circuitry, the number of access blocks is typically indicative of the number of rows or columns that are desired to be accessed simultaneously within a given section. Each simultaneous access requires a separate access block. Hence, in some embodiments, one access block is provided per column for writing to the vector registers.

In some embodiments, the write access circuitry comprises at most one access block for each of the plurality of columns. The number of access blocks controls the extent to which portions of the vector registers can be simultaneously accessed. In some embodiments, the maximum number of simultaneous accesses is one for each portion (column). Accordingly, in such embodiments, there may be no need to provide more access blocks that one per column.

In some embodiments, the set of vector registers comprises at least one section, where each section comprises different columns; the apparatus comprises register access circuitry for each section, each register access circuitry being arranged to access portions in the section associated with that register access circuitry; and for each section the write access circuitry comprises rearrangement circuitry to rearrange inputs to each of the access blocks in the write access circuitry. As previously explained, in the same way that for read access circuitry, the output of some of the portions might be inverted, the inputs to the registers may also have to be inverted. Accordingly, rather than require the user to provide the inputs in a particular order, the inputs can be provided in the intended order and the rearrangement circuitry can re-order the portions such that the data is stored in the correct portions of the vector registers.

There are a number of different options for what rearrangement circuitry could be provided. However, in some embodiments, the rearrangement circuitry is a crossbar multiplexer. Often, such a multiplexer could be provided anyway in order to deal with endian swaps on store instructions, as well as for complex ADD/MUL instructions that need to swap the Real/Imaginary components that are interleaved in the vector registers. Hence, the use of such a multiplexer may not add to the overall circuit size.

There are a number of different configurations of the vector registers. However, in some embodiments, the vector registers are 128-bit registers.

Similarly, there are a number of different ways in which the vector registers can be implemented. However, in some embodiments, each of the vector registers comprises a plurality of 32-bit registers.

Particular embodiments will now be described with reference to the figures.

Figure 1:
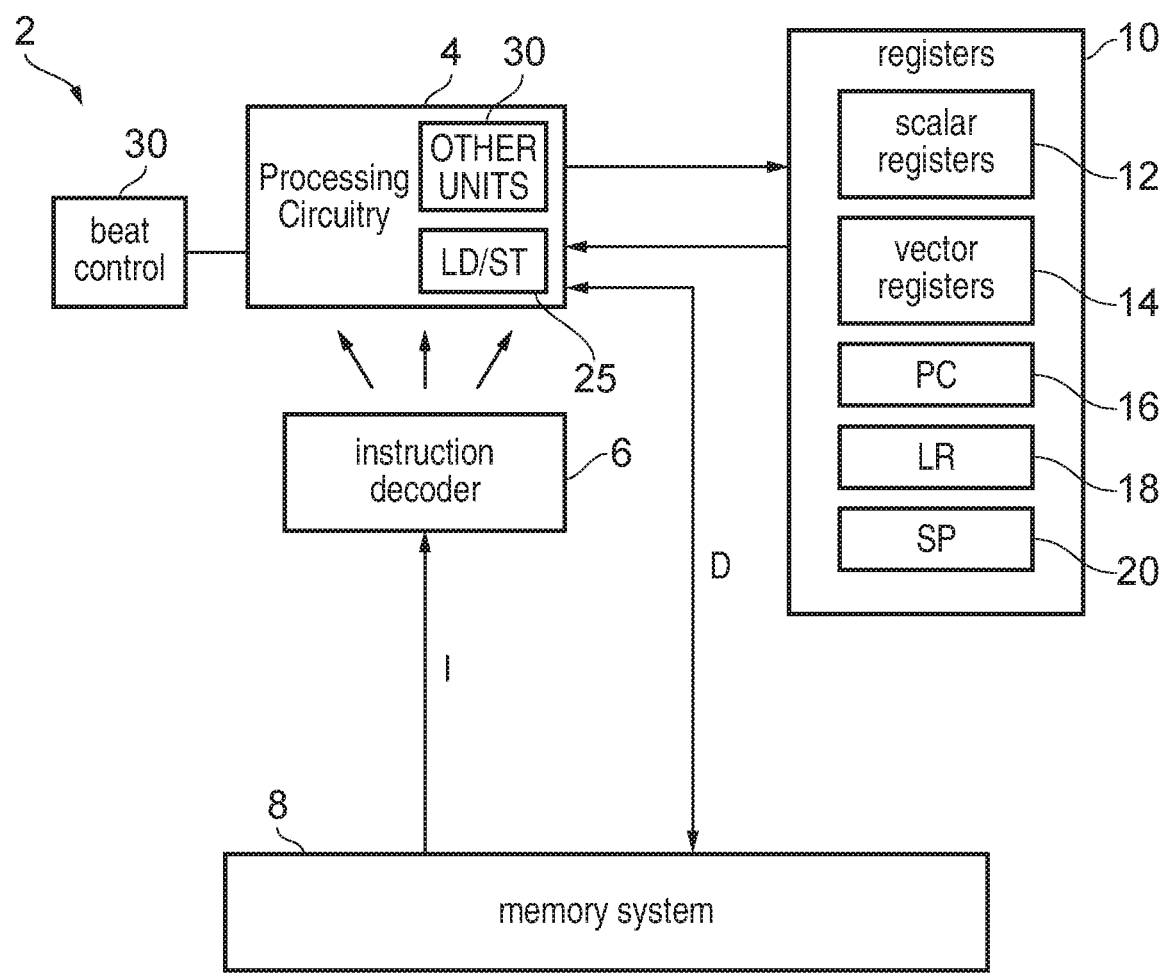

FIG. 1 schematically illustrates an example of a data processing apparatus 2 supporting processing of vector instructions. It will be appreciated that this is a simplified diagram for ease of explanation, and in practice the apparatus may have many elements not shown in FIG. 1 for conciseness. The apparatus 2 comprises processing circuitry 4 for carrying out data processing in response to instructions decoded by an instruction decoder 6. Program instructions are fetched from a memory system 8 and decoded by the instruction decoder to generate control signals which control the processing circuitry 4 to process the instructions in the way defined by the architecture. For example the decoder 6 may interpret the opcodes of the decoded instructions and any additional control fields of the instructions to generate control signals which cause a processing circuitry 4 to activate appropriate hardware units to perform operations such as arithmetic operations, load/store operations or logical operations.

The apparatus has a set of registers 10 for storing data values to be processed by the processing circuitry 4 and control information for configuring the operation of the processing circuitry. In response to arithmetic or logical instructions, the processing circuitry 4 reads operands from the registers 10 and writes results of the instructions back to the registers 10. In response to load/store instructions, data values are transferred between the registers 10 and the memory system 8 via the processing circuitry. The memory system 8 may include one or more levels of cache as well as main memory.

The registers 10 include a scalar register file 12 comprising a number of scalar registers for storing scalar values which comprise a single data element. Some instructions supported by the instructions decoder 6 and processing circuitry 4 are scalar instructions which process scalar operands read from scalar registers 12 to generate a scalar result written back to a scalar register.

The registers 10 also include a vector register file 14 which includes a number of vector registers each for storing a vector (also referred to herein as a vector value) comprising multiple data elements. In response to a vector instruction, the instruction decoder 6 controls the processing circuitry 4 to perform a number of lanes of vector processing on respective elements of a vector operand read from one of the vector registers 14, to generate either a scalar result to be written to the scalar registers 12 or a further vector result to be written to a vector register 14. Some vector instructions may generate a vector result from one or more scalar operands, or may perform an additional scalar operation on a scalar operand in the scalar register file as well as lanes of vector processing on vector operands read from the vector register file 14. Hence, some instructions may be mixed-scalar-vector instructions for which at least one of one or more source registers and a destination register of the instruction is a vector register 14 and another of the one or more source registers and the destination register is a scalar register 12.

Vector instructions may also include vector load/store instructions which cause data values to be transferred between the vector registers 14 and locations in the memory system 8. The load/store instructions may include contiguous vector load/store instructions for which the locations in memory correspond to a contiguous range of addresses, or scatter/gather type vector load/store instructions which specify a number of discrete addresses and control the processing circuitry 4 to load data from each of those addresses into respective elements of a vector register or store data from respective elements of a vector register to the discrete addresses.

The processing circuitry 4 may support processing of vectors with a range of different data element sizes. For example a 128-bit vector register 14 could be partitioned into sixteen 8-bit data elements, eight 16-bit data elements, four 32-bit data elements or two 64-bit data elements for example. A control register within the register bank 10 may specify the current data element size being used, or alternatively this may be a parameter of a given vector instruction to be executed.

The registers 10 also include a number of control registers for controlling processing of the processing circuitry 4. For example these may include a program counter register 16 for storing a program counter address which is indicative of an address of an instruction corresponding to a current execution point being processed, a link register 18 for storing a return address to which processing is to be directed following handling of a function call, and a stack pointer register 20 indicating the location within the memory system 8 of a stack data structure. It will be appreciated that these are just some of the types of control information which could be stored, and in practice a given instruction set of architecture may store many other control parameters as defined by the architecture. For example, a control register may specify the overall width of a vector register, or the current data element size being used for a given instance of vector processing.

The processing circuitry 4 may include a number of distinct hardware blocks for processing different classes of instructions. For example, as shown in FIG. 1, load/store instructions which interact with a memory system 8 may be processed by a dedicated load/store unit (LSU) 25, while arithmetic or logical instructions could be processed by one or more other units 30. These other units may include an arithmetic logic unit (ALU), and the ALU itself may be further partitioned into a multiply-accumulate unit (MAC) for performing operations involving multiplication, and a further unit for processing other kinds of ALU operations. A floating-point unit can also be provided for handling floating-point instructions. Pure scalar instructions which do not involve any vector processing could also be handled by a separate hardware block compared to vector instructions, or reuse the same hardware blocks.

Figure 2:
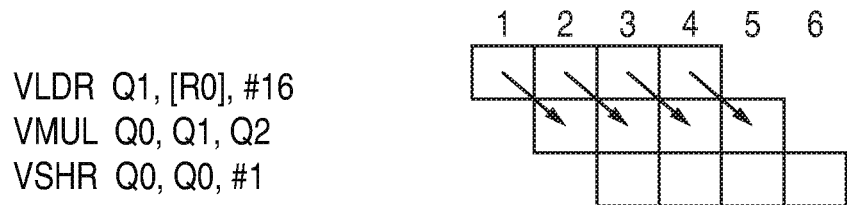
FIG. 2 shows an example of overlapped execution of vector instructions.

In some applications such as digital signal processing (DSP), there may be a roughly equal number of ALU and load/store instructions and therefore some large blocks such as the MACs can be left idle for a significant amount of the time. This inefficiency can be exacerbated on vector architectures as the execution resources are scaled with the number of vector lanes to gain higher performance. On smaller processors (e.g. single issue, in-order cores) the area overhead of a fully scaled out vector pipeline can be prohibitive. One approach to minimise the area impact whilst making better usage of the available execution resource is to overlap the execution of instructions, as shown in FIG. 2. In this example, three vector instructions include a load instruction VLDR, a multiply instruction VMUL and a shift instruction VSHR, and all these instructions can be executing at the same time, even though there are data dependencies between them. This is because element 1 of the VMUL is only dependent on element 1 of Q1, and not the whole of the Q1 register, so execution of the VMUL can start before execution of the VLDR has finished. By allowing the instructions to overlap, expensive blocks like multipliers can be kept active more of the time.

Hence, it can be desirable to enable micro-architectural implementations to overlap execution of vector instructions. However, if the architecture assumes that there is a fixed amount of instruction overlap, then while this may provide high efficiency if the micro-architectural implementation actually matches the amount of instruction overlap assumed by architecture, it can cause problems if scaled to different micro-architectures which use a different overlap or do not overlap at all.

Figure 3:
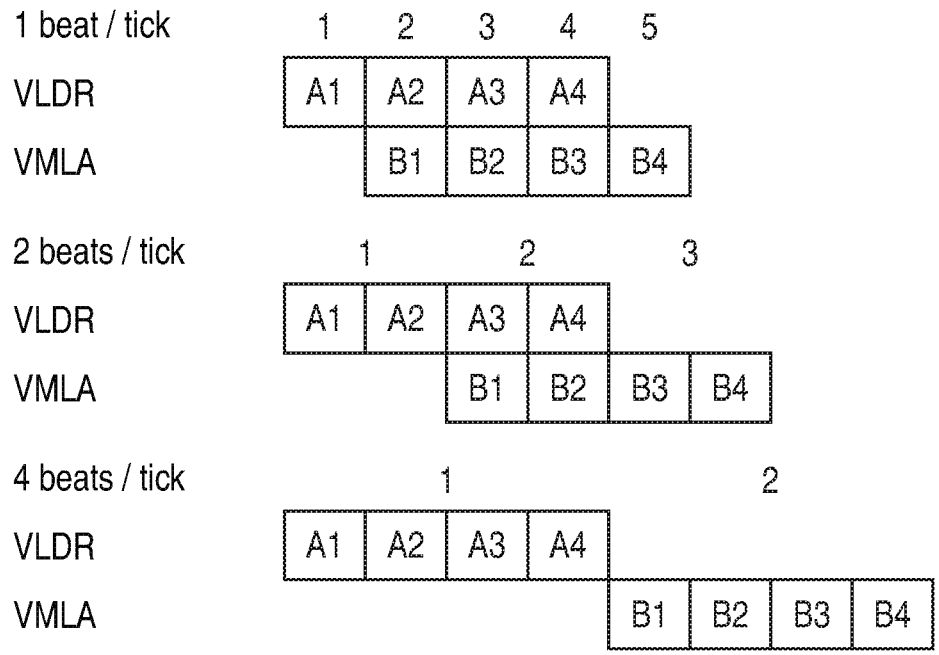
FIG. 3 shows three examples of scaling the amount of overlap between successive vector instructions between different processor implementations or at run time between different instances of execution of the instructions.

Instead, an architecture may support a range of different overlaps as shown in examples of FIG. 3. The execution of a vector instruction is divided into parts referred to as "beats", with each beat corresponding to processing of a portion of a vector of a predetermined size. A beat is an atomic part of a vector instruction that is either executed fully or not executed at all, and cannot be partially executed. The size of the portion of a vector processed in one beat is defined by the architecture and can be an arbitrary fraction of the vector. In the examples of FIG. 3 a beat is defined as the processing corresponding to one quarter of the vector width, so that there are four beats per vector instruction. Clearly, this is just one example and other architectures may use different numbers of beats, e.g. two or eight. The portion of the vector corresponding to one beat can be the same size, larger or smaller than the data element size of the vector being processed. Hence, even if the element size varies from implementation to implementation or at run time between different instructions, a beat is a certain fixed width of the vector processing. If the portion of the vector being processed in one beat includes multiple data elements, carry signals can be disabled at the boundary between respective elements to ensure that each element is processed independently. If the portion of the vector processed in one beat corresponds to only part of an element and the hardware is insufficient to calculate several beats in parallel, a carry output generated during one beat of processing may be input as a carry input to a following beat of processing so that the results of the two beats together form a data element.

As shown in FIG. 3 different micro-architecture implementations of the processing circuit 4 may execute different numbers of beats in one "tick" of the abstract architectural clock. Here, a "tick" corresponds to a unit of architectural state advancement (e.g. on a simple architecture each tick may correspond to an instance of updating all the architectural state associated with executing an instruction, including updating the program counter to point to the next instruction). It will be appreciated by one skilled in the art that known micro-architecture techniques such as pipelining may mean that a single tick may require multiple clock cycles to perform at the hardware level, and indeed that a single clock cycle at the hardware level may process multiple parts of multiple instructions. However such micro-architecture techniques are not visible to the software as a tick is atomic at the architecture level. For conciseness such micro-architecture are ignored during further description of this disclosure.

As shown in the lower example of FIG. 3, some implementations may schedule all four beats of a vector instruction in the same tick, by providing sufficient hardware resources for processing all the beats in parallel within one tick. This may be suitable for higher performance implementations. In this case, there is no need for any overlap between instructions at the architectural level since an entire instruction can be completed in one tick.

On the other hand, a more area efficient implementation may provide narrower processing units which can only process two beats per tick, and as shown in the middle example of FIG. 3, instruction execution can be overlapped with the first and second beats of a second vector instruction carried out in parallel with the third or fourth beats of a first instruction, where those instructions are executed on different execution units within the processing circuitry (e.g. in FIG. 3 the first instruction is a load instruction executed using the load/store unit 25 and the second instruction is a multiply accumulate instruction executed using the MAC unit forming one of the other units 30).

A yet more energy/area-efficient implementation may provide hardware units which are narrower and can only process a single beat at a time, and in this case one beat may be processed per tick, with the instruction execution overlapped and staggered by one beat as shown in the top example of FIG. 3 (this is the same as the example shown in FIG. 2 above).

It will be appreciated that the overlaps shown in FIG. 3 are just some examples, and other implementations are also possible. For example, some implementations of the processing circuitry 4 may support dual issue of multiple instructions in parallel in the same tick, so that there is a greater throughput of instructions. In this case, two or more vector instructions starting together in one cycle may have some beats overlapped with two or more vector instructions starting in the next cycle.

As well as varying the amount of overlap from implementation to implementation to scale to different performance points, the amount of overlap between vector instructions can also change at run time between different instances of execution of vector instructions within a program. Hence, the processing circuitry 4 may be provided with beat control circuitry 30 as shown in FIG. 1 for controlling the timing at which a given instruction is executed relative to the previous instruction. This gives the micro-architecture the freedom to select not to overlap instructions in certain corner cases that are more difficult to implement, or dependent on resources available to the instruction. For example, if there are back to back instructions of a given type (e.g. multiply accumulate) which require the same resources and all the available MAC or ALU resources are already being used by another instruction, then there may not be enough free resources to start executing the next instruction and so rather than overlapping, the issuing of the second instruction can wait until the first has completed.

Figure 4:
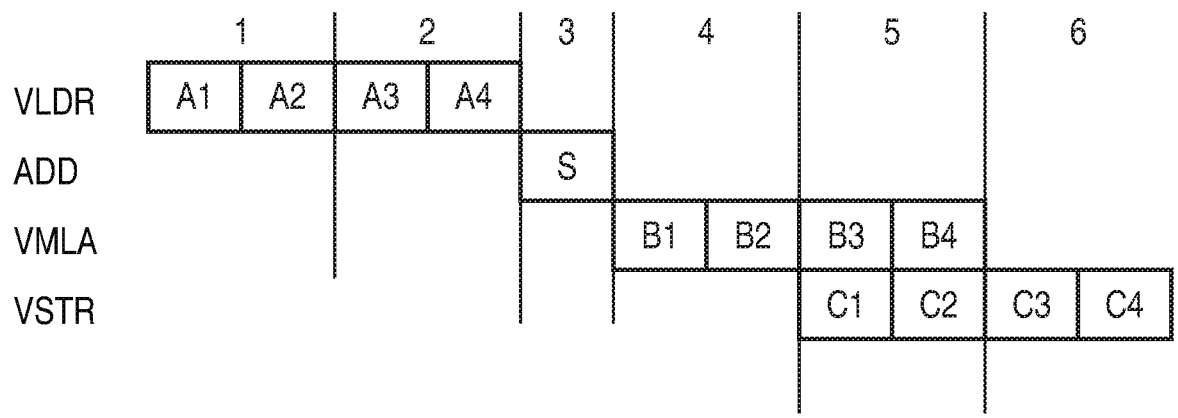
FIG. 4 shows an example where the execution of a scalar instruction breaks the overlap between two vector instructions.

As shown in FIG. 4, the overlap between two vector instructions may also be prevented if there is an intervening scalar instruction. This is because the scalar instruction could depend on the outcome of the last beat of the vector instruction and the second vector instruction could depend on the scalar result in all of its beats, so it may be safer to avoid overlapping vector instructions with scalar instructions.

When overlaps are permitted as discussed above, then there may be multiple instructions executing simultaneously. The program counter 16 may track the address of the oldest uncompleted instruction which has at least one beat still to be completed. The program counter can be incremented when a vector instruction completes its final beat.

In addition to performing standard vector load/store operations and scatter/gather type vector load/store operations, the LSU 25 can be arranged to also perform a rearrangement operation as the data elements of the specified vectors are moved between the memory system 8 and the set of vector registers 14, which can assist in ensuring that the data elements of the vectors are arranged within the vector registers in a manner that facilitates efficient performance of further vector operations upon them. The data elements can be considered to form data structures. For instance, considering audio data, a data structure may comprise a number of data elements relating to different audio channels. For example, considering simple stereo audio, each data structure may comprise a data element for the left channel and a data element for the right channel. Similarly, when considering image data, a data structure may comprise multiple components such as red, green, blue and alpha (RGBA) data element components. It is often the case that the data elements are organised in a particular way within the memory system, but it is desirable to organise those data elements differently within the vector registers. For example, the data elements of each data structure may be arranged contiguously in the memory, whilst within the vector registers it may be desired to rearrange the individual data elements so that corresponding data elements from multiple data structures are arranged contiguously within each vector register. Hence, considering the earlier-described image data example, it may be desirable to arrange for a series of data elements relating to the R components of a number of data structures to be placed contiguously within one vector register, a series of data elements relating to the G components to be arranged contiguously within another vector register and so on. In such an example, the data elements within a number of data structures accessed during a vector load operation can be de-interleaved as they are moved into the vector registers from memory, and can then later be interleaved as they are stored back from the vector registers to memory during a vector store operation.

By supporting such rearrangement operations within the LSU 25, this can significantly improve performance, as it avoids the need to execute additional instructions to perform a number of additional manipulations on the data elements after they have been stored within the vector registers in order to arrange those data elements in a manner required for subsequent processing. However, the amount of computation required by such a vector load or store instruction is quite large, and in certain implementations may mean that the instruction will stall for several cycles. This can give rise to performance problems, which can be further exacerbated in systems that allow overlapped execution of memory and arithmetic operations.

In accordance with embodiments described hereafter, instead of using one monolithic load or store instruction, the rearrangement operation is effectively split across multiple instructions, so that the rearrangement operation is performed as a result of executing a plurality of rearrangement instructions forming a group of rearrangement instructions. Each rearrangement instruction in the group defines a data element access pattern that differs to the data element access pattern defined by each other rearrangement instruction in the group. The rearrangement access pattern is used to identify both the addresses of the data elements to be accessed in memory and the particular parts of vector registers to be assessed.

Figure 5:
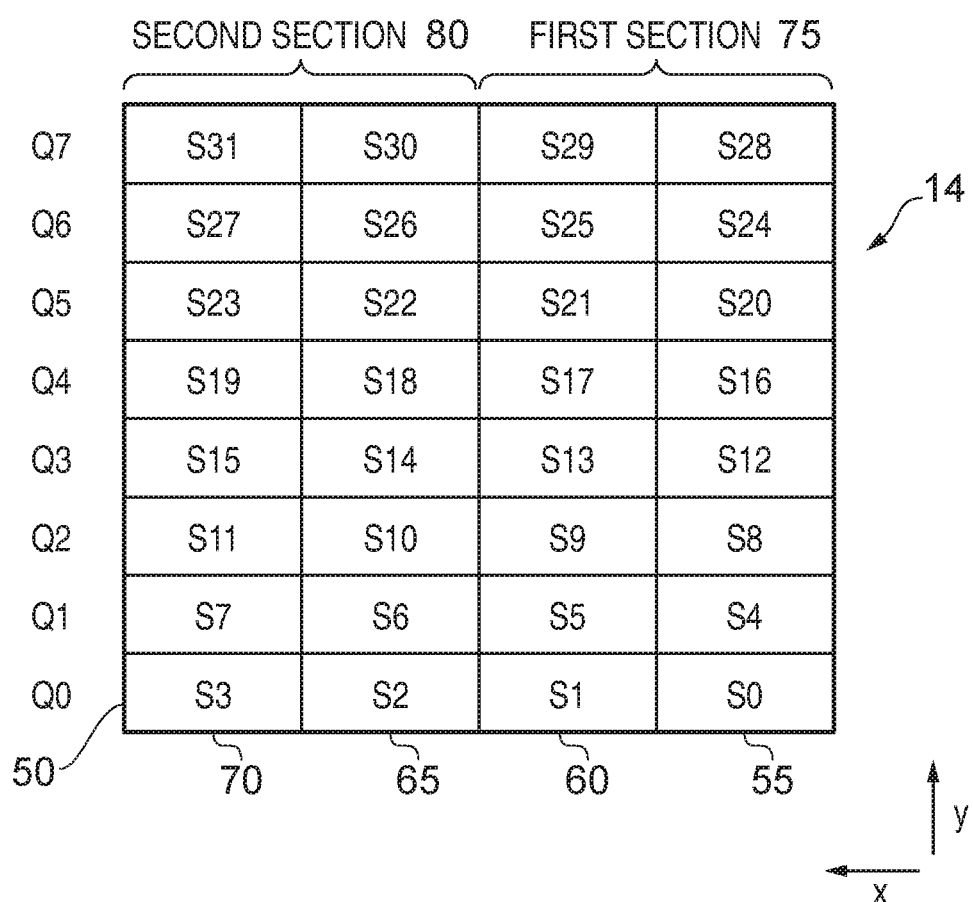
FIG. 5 is a diagram schematically illustrating how the set of vector registers may be logically arranged in multiple sections.

FIG. 5 illustrates the set of vector registers 14 in accordance with one embodiment. In this embodiment, 8 vector registers Q0 to Q7 are provided, and in the embodiment shown in FIG. 5 each vector register is formed from multiple scalar registers. Hence, the vector register Q0 50 is formed from the four scalar registers 55, 60, 65, 70. The scalar registers can be accessed independently, and indeed individual parts within the scalar registers can be accessed if desired. Whilst in the embodiment of FIG. 5 each vector register is constructed of multiple scalar registers, this is not a requirement, but however the vector registers are constructed, the vector register set is arranged so that individual parts within the vector registers can be updated independently of other parts.

The number of data elements stored within each vector register will be dependent on the size of the data elements, and in one embodiment multiple different sizes of data elements are supported. For example, in one embodiment the vector registers are 128 bits in length and the data elements processed by the system may be 64-bit data elements, 32-bit data elements, 16-bit data elements or 8-bit data elements. It will be appreciated that this is merely an illustrative example, and in other embodiments the size of the vector registers and the size of the data elements supported may be different. When considering the specific example of FIG. 5, each of the scalar registers 55, 60, 65, 70 are 32-bit registers and hence when the data element size is 32 bits or less each scalar register will store one or more data elements.

As will be discussed in more detail later, the set of vector registers 14 can be logically considered to consist of multiple sections, for example the first section 75 and the second section 80 shown in FIG. 5. Whilst the vector registers are shown as being logically divided into two sections in FIG. 5, they can be divided into more than two sections if desired. As will be discussed in more detail later, by appropriate selection of the access patterns for the individual rearrangement instructions in the group, it can be arranged that during execution of each rearrangement instruction in the group, separate accesses are performed to contiguous words in the memory, and those separate accesses can be arranged to take place to different sections 75, 80 within the vector registers. This facilitates overlapping of such memory access instructions with arithmetic instructions. For example, whilst one such rearrangement instruction is accessing the second section 80, an arithmetic instruction may be executed that accesses the first section 75.

Figure 6:
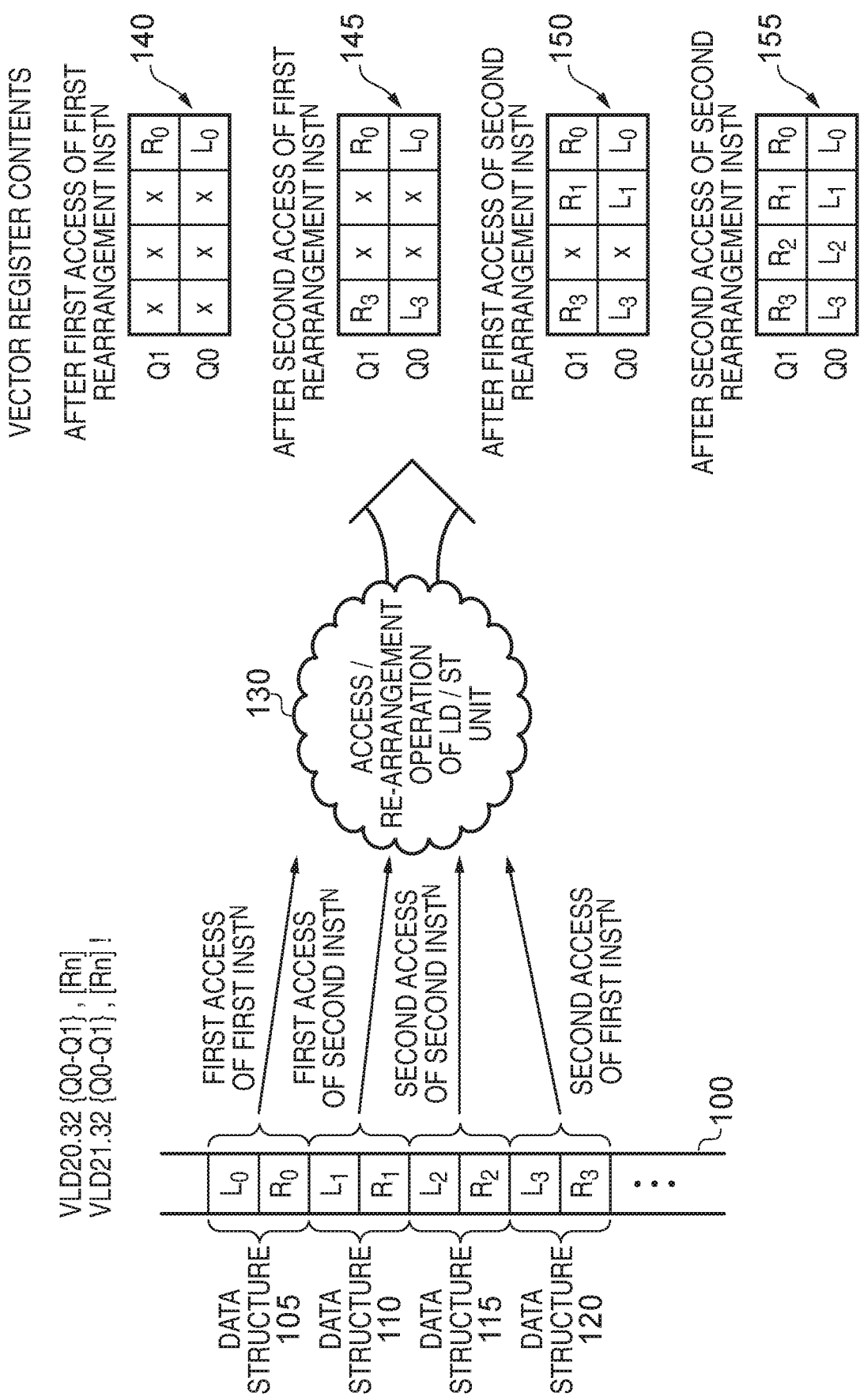
FIG. 6 is a diagram schematically illustrating how a group of load instructions may be arranged in one embodiment so as to collectively perform a de-interleave operation on data loaded from memory into the vector registers.

FIG. 6 is a diagram illustrating how a group of rearrangement instructions may be arranged to perform a de-interleave operation in accordance with one embodiment. In particular, two vector load (VLD) instructions form a group of instructions that collectively, when executed, perform a de-interleave operation. These VLD instructions are VLD2n instructions, the "2" indicating a stride of 2, i.e. that there are two data elements in each data structure. The "0" in the "VLD20" instruction identifies that that vector load instruction is the first instruction in the group, and hence effectively identifies a particular access pattern identifier. Similarly, the "VLD21" instruction is the second instruction in the group, with the "1" effectively providing a different access pattern identifier.

As can also be seen from FIG. 6, both instructions identify that they are operating on 32-bit data elements, and identify the same two vector registers (in this example Q0 and Q1). A base address is also specified by the contents of the scalar register Rn. The "1" at the end of the second instruction identifies that execution of that instruction will also cause the base address in the register Rn to be updated.

In accordance with the embodiment illustrated in FIG. 6, it is assumed that the access pattern associated with both vector load instructions causes two 64-bit contiguous memory accesses to be performed. Hence, assuming the memory word size is 32 bits, the first access will access two contiguous 32-bit memory words, and then the second access will access a further two contiguous 32-bit memory words. Since the data element size is also 32 bits, this means that each access will access two contiguous 32-bit data elements.

In accordance with the particular access pattern illustrated in FIG. 6, execution of the first VLD2n instruction causes the data structure 105 to be accessed during processing of the first access of that first instruction by the access/rearrangement operation 130 of the LSU 25, and then the data structure 120 to be accessed during the second access of that first instruction. The access pattern will also cause the two data elements of the first data structure 105 (in this example it is assumed that the data structures represent audio data formed of left and right audio components) to be loaded into a first lane within the two vector registers Q0 and Q1, as indicated by the register content 140 in FIG. 6 (where "x" indicates no update is performed to these elements and the previous value is preserved). In the following description, each of the data element positions within a vector register will be referred to as a lane, since when performing arithmetic operations on vector registers, operations can be performed in parallel within the data elements in each of the lanes.

As shown by the registers contents 145, once the second access of the first instruction has been performed, then the data elements of the data structure 120 are placed within a final lane of the vector registers. As will be apparent from the earlier referenced FIG. 5, the first access of the first vector load instruction accesses the first section 75 of the vector registers 14, whilst the second access accesses the second section 80.

Similarly, as shown in FIG. 6, when the access/rearrangement operation of the load/store unit 130 is performed as a result of executing the second vector load instruction, the first access accesses the data structure 110 and stores the two data elements within the second lane as shown by the register contents 150, and the second access then accesses the data structure 115 and stores the data elements in the third lane as indicated by the vector register contents 155. Again, it can be seen that the first access accesses the first section 75 of the vector registers whilst the second access accesses the second section 80.

When adopting the four beats per tick approach discussed earlier with reference to FIG. 3, and assuming a memory system that is at least a quad banked memory system, such an access pattern would allow the first and second accesses of each instruction to occur simultaneously since the addresses associated with each beat will access different memory banks. If instead the two beat per tick configuration is used as also discussed earlier with reference to FIG. 3, then the first and second accesses for each instruction can occur one after the other. Where the memory comprises at least two memory banks, the use of the pattern shown in FIG. 6 will allow two memory banks to be accessed during each access, hence improving performance.

The access patterns associated with each of the rearrangement instructions that collectively form a group of rearrangement instructions can take a variety of forms. As mentioned earlier, each rearrangement instruction in a group will define a data element access pattern that differs to the data element access pattern defined by each other rearrangement instruction in the group, and in one embodiment this ensures that different data elements are moved between the memory and the multiple vector registers during execution of each rearrangement instruction in the group. In addition, the access patterns are defined so that more than one vector register is accessed during performance of each rearrangement instruction. In one embodiment, the access pattern is such that execution of each rearrangement instruction causes at least one data element to be accessed in each of the multiple vector registers that are involved in the rearrangement operation. It has been found that such an approach can make the access patterns simpler to implement.

Figures 7C, 7D, 7E:
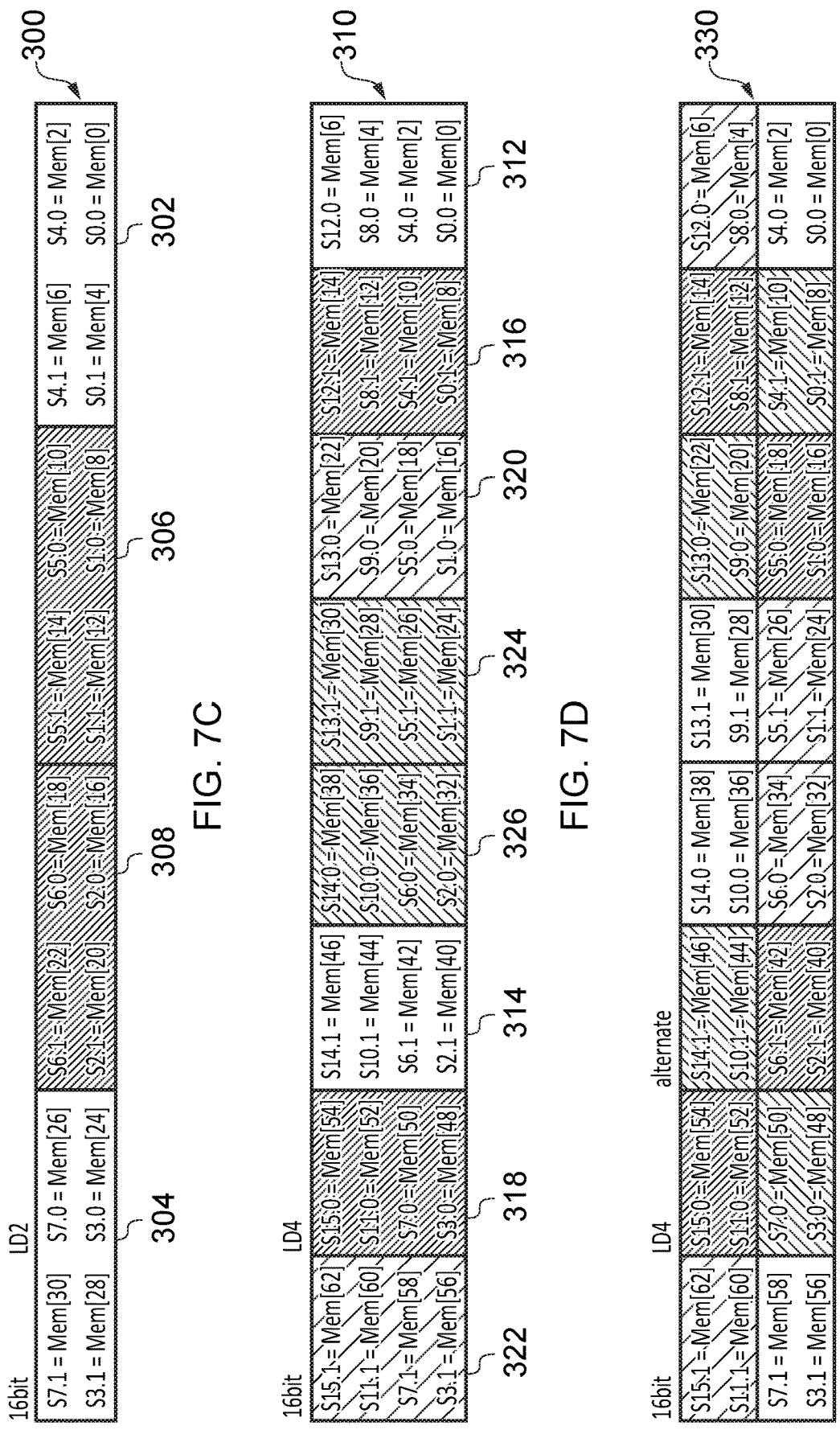

FIGS. 7A to 7G illustrate various different examples of access patterns that can be associated with each of the different rearrangement instructions in a group, for various different data element sizes. These are merely illustrative, and it will be appreciated that many different access patterns could also be used. These figures show how the patterns dictate which parts of the vector registers are accessed during execution of each rearrangement instruction in a group, and indicate which memory addresses are accessed. FIG. 7A shows the vector register access patterns adopted when executing two vector load instructions in a group that operate on 32-bit data elements and access vector registers Q0 and Q1, these patterns corresponding to the ones shown schematically in FIG. 6. In particular, the access patterns 200 consist of four parts 205, 210, 215, 220. When the first vector load instruction is executed, a first access accesses addresses at memory offset 0 and 4 with respect to the base address, and stores the contents in the scalar registers S0 and S4, as indicated by the block 205. The second access of the first instruction then accesses memory at offsets 24 and 28, and stores the contents in the scalar registers S3 and S7, as shown by the block 210. It will be appreciated that although S0 to S7 (making up vector registers Q0 and Q1) are accessed in FIG. 7A the scalar registers accessed are dependent on the vector registers specified by the rearrangement instructions. In another example the rearrangement instructions may, for instance, specify Q1 and Q2 as destination vector registers, in which case scalar registers S4 to S11 would be accessed.

As will be apparent from the earlier discussed FIG. 6, execution of the first instruction does not cause the base register contents to be updated, and accordingly when the second instruction is executed the offsets are still calculated with respect to the same base address. The first access of the second instruction will hence access addresses at memory offsets 8 and 12 with respect to the base address, with the retrieved data elements being stored in the scalar registers S1 and S5, as shown by the block 215. Similarly the second access will cause memory to be accessed at the offsets 16 and 20 with the contents being stored in the scalar registers S2 and S6, as shown by the block 220. As will be apparent from the earlier discussion of FIG. 5, whilst for ease of illustration reference is made to scalar register numbers, it will be understood that those scalar registers effectively form the two vector registers Q0 and Q1, and hence the scalar register numbers merely identify different parts of the vector registers.

FIG. 7B illustrates another series of vector register access patterns 225 that can be used when a group of four vector load instructions accessing vector registers Q0 to Q3 are used to implement vector loading with a stride of 4 (i.e. where each data structure comprises four data elements, as for example is the case in the earlier-described RGBA example). Again, it is assumed that the data elements are 32 bits in size. When the first instruction is executed, it performs the two accesses illustrated by the boxes 230, 235, retrieving two data elements with offsets of 0 and 4 with respect the base address and storing them in the scalar register positions S0 and S4, and then in a second access accessing the two data elements at memory offsets 40 and 44 with respect to the base address, and storing them in the scalar registers S10 and S14. When the second instruction is executed, it then performs the accesses shown by the two blocks 240 and 245. Similarly, when the third instruction is executed, it performs the two accesses illustrated by the blocks 250 and 255. Finally, when the fourth instruction is executed, it performs the two accesses illustrated by the blocks 260 and 265.

It will be appreciated that which access patterns are associated with which instructions in the group is not important, provided that collectively all of the access patterns are used. This comment applies equally to all of the examples of FIGS. 7A to 7G.

Using the same representation as discussed earlier with reference to FIG. 6 for the VLD2n instructions, the four vector load instructions used to perform the pattern of accesses shown schematically in FIG. 7B can take the following form:

VLD40.32 {Q0-Q3}, [Rn]
VLD41.32 {Q0-Q3}, [Rn]
VLD42.32 {Q0-Q3}, [Rn]
VLD43.32 {Q0-Q3}, [Rn] !

As is apparent from FIG. 7B, as each of the VLD4n instructions is executed, it writes to a quarter of the four vector registers according to the patterns shown in FIG. 7B. As will be apparent from a review of FIGS. 7A and 7B, for both the VLD2n and VLD4n group of instructions, each instruction performs two 64-bit contiguous memory accesses. Further, the address bits [3:2] are different for every word access performed by a single instruction, which makes for more efficient access to the memory sub-system when that memory sub-system adopts multiple memory banks. Further, both the memory and register access patterns are designed so that they can be computed easily with bit-wise logic. This will be discussed later in FIGS. 8 and 9 by way of example with reference to the group of VLD4n instructions.

It is also seen that each instruction, when executed, stores 64 bits to each half of the vector register file. This means that on a dual beat architecture there are no accesses that cross the centre line of register file, and accordingly the instructions are compatible with the earlier-described overlapped execution of memory and arithmetic operations without the need for extra dependency checking or stalling. These factors make the instructions easy to implement, and allow efficient usage of the memory sub-system.

FIGS. 7C and 7D illustrate equivalent access patterns 300, 310 that can be used for VLD2n and VLD4n groups of instructions, when the data element sizes are 16 bits rather than 32 bits. Considering FIG. 7C, the access patterns 300 consist of the blocks 302, 304 that are accessed by the two accesses of the first VLD instruction, and the blocks 306, 308 that are accessed by the two accesses of the second VLD instruction.

Similarly, considering FIG. 7D, the access patterns 310 consist of the blocks 312, 314 associated with the two accesses of the first instruction, the blocks 316, 318 associated with the two accesses of the next instruction, the blocks 320, 322 associated with the two accesses of the third instruction and the blocks 324, 326 associated with the two accesses of the fourth instruction.

As will be apparent from a comparison of FIGS. 7C and 7D with FIGS. 7A and 7B, the base address offsets increase by two in each of the blocks in FIGS. 7C and 7D as opposed to increasing by four within each of the blocks in FIGS. 7A and 7B, due the data element size being 16 bits for the examples of FIGS. 7C and 7D, as opposed to 32 bits for the examples of FIGS. 7A and 7B.

Whilst in the preceding examples each instruction performs two accesses, more than two accesses can be performed for each instruction if desired. For example, FIG. 7E illustrates a series of alternative access patterns 330, where four accesses (each being a 32-bit contiguous access) are associated with each of the instructions. Again, the accesses can be split between multiple memory banks.

Figures 7F, 7G:
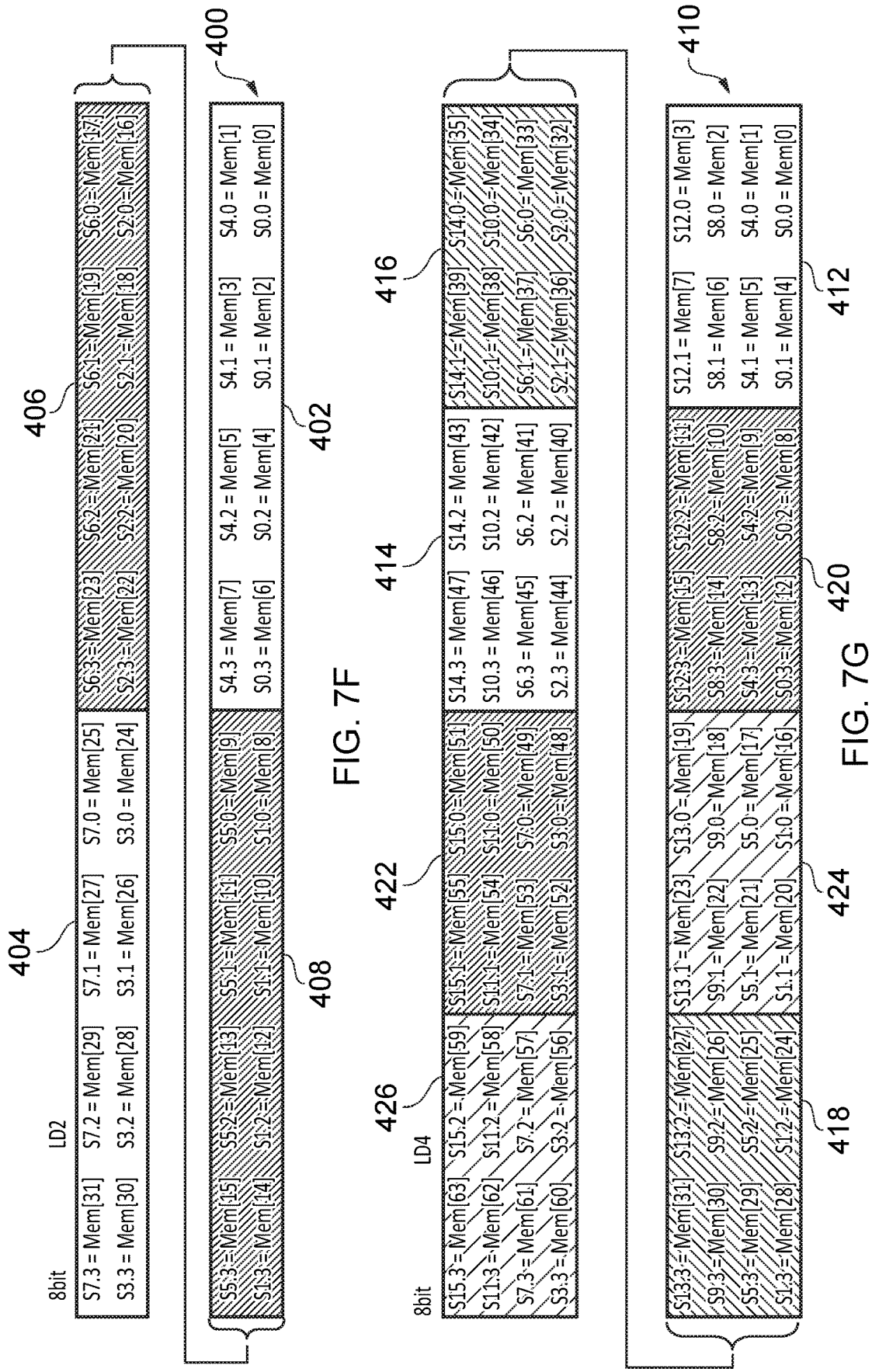

FIGS. 7F and 7G illustrate example access patterns 400, 410 that can be adopted for VLD2n and VLD4n instructions when the data element size is 8 bits. Hence, considering FIG. 7F, the first VLD2n instruction causes block 402 to be accessed during a first access and block 404 to be accessed during a second access, whilst the second VLD2n instruction causes block 406 to be accessed during a first access and block 408 to be accessed during a second access.

FIG. 7G illustrates a series of access patterns 410 for a group of four VLD4n instructions. The first VLD4n instruction causes block 412 to be accessed during a first access and block 414 to be accessed during a second access, whilst the second VLD4n instruction causes block 416 to be accessed during a first access and block 418 to be accessed during a second access. Similarly the third VLD4n instruction causes block 420 to be accessed during a first access and block 422 to be accessed during a second access, whilst the final VLD4n instruction causes block 424 to be accessed during a first access and block 426 to be accessed during a second access. As mentioned earlier, which access patterns are associated with which instructions in the group can be varied if desired.

Whilst FIGS. 7A to 7G show access patterns used in association with groups of vector load instructions, the same access patterns can also be used for the corresponding groups of vector store instructions, the only difference being that the data is moved from the vector registers back to memory, rather than being moved from memory to the vector registers.

Figure 8:
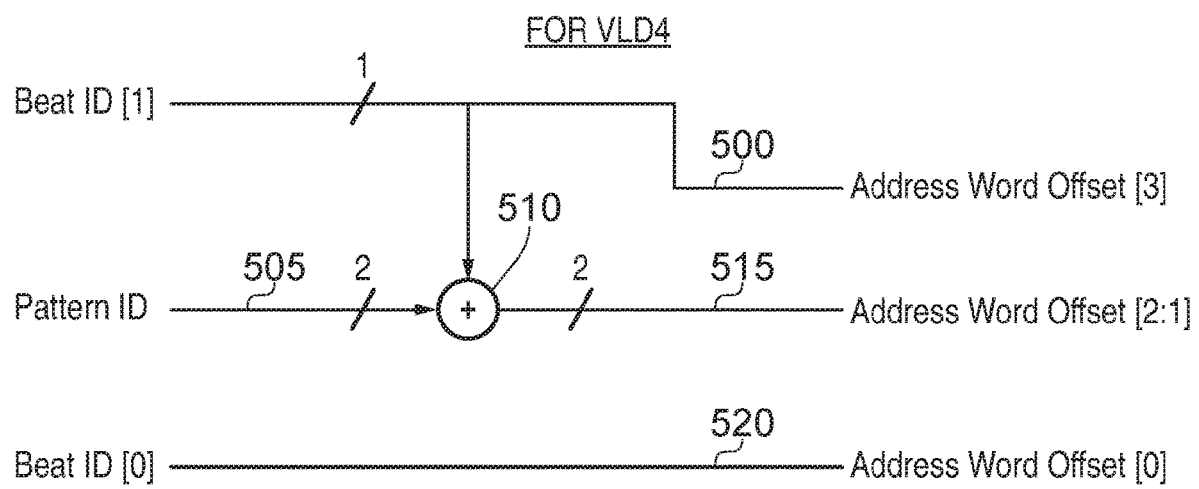
FIG. 8 is a diagram illustrating how pattern ID and beat ID information can be used to generate an address word offset in order to identify the addresses to be accessed in memory when executing one of the vector load instructions with a stride of 4 (VLD4n instructions) in accordance with one embodiment.

FIG. 8 is a diagram illustrating how address word offsets into memory can be generated using the pattern identifier specified by a particular instruction and the beat identifier bits identifying which beat of the instruction is currently being processed, and hence how far through the pattern the process has reached. The illustrated logic is used for the group of VLD4n instructions used to produce the memory access pattern shown in FIG. 7B. A two bit pattern ID value 505 is provided to the input of the adder 510, along with bit 1 of the beat ID. Bit 0 the beat ID is output over path 520, whilst beat 1 of the beat ID is output over path 500. The adder produces an output over path 515. Collectively the outputs 500, 515, 520 form the address word offsets shown in FIG. 8, and hence produce a four bit address word offset. That value is then multiplied by four to get the byte address, which is then added to the base address in the register Rn in order to identify the actual memory address to access.

Considering by way of example the first and second accesses of the particular pattern shown by the blocks 230 and 235 in FIG. 7B, it will be seen that for the first 32-bit beat the address word offset produced is 0000 (it being assumed that the pattern ID is 00 for this pattern). For the next beat, the offset is then 0001 due to the beat ID bit 0 changing from 0 to 1. For the next beat, beat ID bit 0 returns to 0 but beat ID bit 1 changes to a value of 1. This causes the address word offset to be 1010, which when multiplied by four gives a byte address offset of 40 as shown for the first word access in block 235 of FIG. 7B. Then, for the final beat, beat ID bit 0 changes to 1 giving an address word offset of 1011, identifying the byte address offset of 44 associated with the final word access in block 235.

Whilst the above description of the address generation logic of FIG. 8 makes reference to the example of FIG. 7B where 32-bit data elements are operated on, the same address generation logic can be used for VLD4n instructions operating on different sized data elements, for example 16-bit or 8-bit data elements when using the access patterns of FIG. 7D or 7G. However, if the alternative access pattern of FIG. 7E was used, the address generation logic would need to be modified accordingly.

Figure 9:
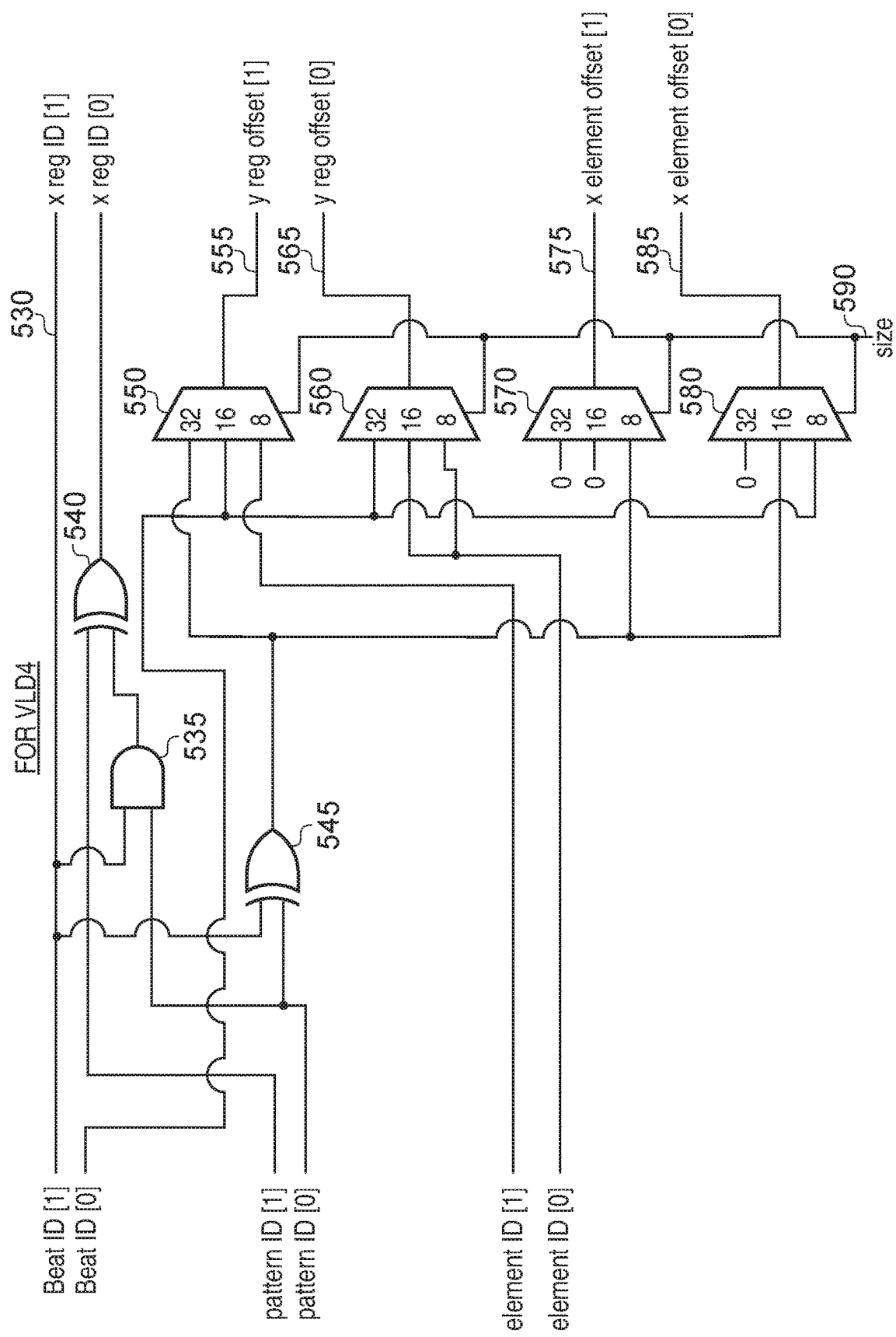
FIG. 9 illustrates circuitry that can be used to determine the appropriate parts of the vector registers to access during execution of a VLD4n instruction in accordance with one embodiment.

FIG. 9 is a block diagram illustrating logic that can be used to identify the particular parts within the vector registers to be accessed when executing a group of VLD4n instructions. In addition to the beat identifier bits and pattern identifier bits discussed earlier, element identifier bits are also provided, although these bits are only used when the data element size is less than 32 bits. The various beat ID and pattern ID bits are logically combined using the gates 535, 540, 545 shown in FIG. 9. The x register identifier identifies which of the four scalar registers within a vector register are to be accessed, starting from the right hand side of FIG. 5. Hence, an x register identifier of 00 will identify the right-hand most scalar register of a vector register, and an x register identifier of 01 will identify the next scalar register to the left, etc. The y register offset bits identify an offset relative to the first Q register identified by the instruction. Whilst some instructions may specify Q0 as the first register, this is not required, and hence purely by way of illustration the first vector register might be Q4, with the y register offset being then specified in the vertical direction shown in FIG. 5 relative to Q4. The x element offset bits are used to identify which parts of the identified scalar registers are accessed, in situations where the data element size is 16 or 8 bits. As can be seen from FIG. 9, the size information is provided as a control input to each of the multiplexers 550, 560, 570, 580, and when the data element size is 32 bits, the output from both multiplexers 570 and 580 is a logic 0 value, and hence the x element offset has no effect. For 16-bit data elements, the x element offset bit 0 is controlled by the output of the multiplexer 580, and the x element offset bit 1 is fixed at 0 by the output from the multiplexer 570. However, for 8-bit data elements, both of the multiplexers 570, 580 will produce an output dependent on their lower most input, and hence both bits of the x element offset value are used.

As will be apparent from the earlier discussions, the pattern ID value is effectively specified by the opcode of the particular instruction. The beat ID and element ID information can be maintained in a variety of ways, and for example may be maintained in local counters referred to by the LSU 25 when executing each rearrangement instruction.

The logic of FIG. 9 can be used for VLD4n instructions operating on different sized data elements, for example 32-bit, 16-bit or 8-bit data elements when using the access patterns of FIG. 7B, 7D or 7G, respectively. However, if the alternative access pattern of FIG. 7E was used, the logic of FIG. 9 would need to be modified accordingly.

Figure 10:
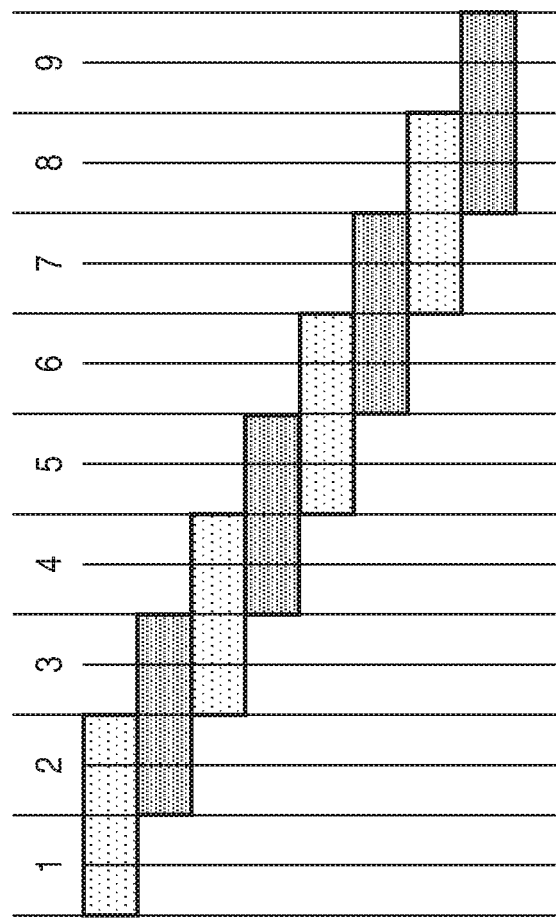
FIG. 10 is a timing diagram illustrating how vector load and multiply-accumulate instructions can be overlapped in accordance with one embodiment.

FIG. 10 illustrates some example code that de-interleaves data from memory (for example left and right audio channels) and performs multiply accumulate operations on the data. As can be seen, the VLD2n instructions are arranged as a group of two instructions, the group being executed twice in the section of code shown in FIG. 10. As shown in the right-hand section of the diagram, these new groups of rearrangement instructions allow both the memory interface and the multiply-accumulate hardware to be kept busy 100% of the time without any stalls. In the example shown a two beats per tick arrangement is used, and hence each VLD instruction can be overlapped with a suitable multiply-accumulate instruction, with those two instructions accessing different sections of the vector registers.

FIGS. 11A to 11D illustrate particular encodings of the vector load and vector store instructions that may be provided in one embodiment, for a stride of two (where two vector instructions are arranged to form a group) and a stride of four (where four vector instructions are arranged to form a group). Considering first the VLD2n instruction in FIG. 11A, each VLD2n instruction, when executed, causes two 64-bit contiguous blocks of data to be loaded from memory and written to parts of two destination registers. The parts of the destination registers written to, and the offsets from the base address register, are determined by the "pat" parameter. If the instruction is executed two times with the same base address and destination registers, but with different "pat" values, the effect is to load data from memory and to de-interleave it into the specified registers with a stride of two. The base address register can optionally be incremented by 32 on executing the second instruction in the group, to indicate that 32 bytes of data have been processed and to update the pointer in the base register ready for a subsequent groups of VLD2n instructions.

Considering the VLD4n instruction of FIG. 11B, each time such an instruction is executed it also loads two 64-bit contiguous blocks of data from memory, but in this case writes the data to parts of four destination registers. The parts of the destination registers written to, and the offsets from the base address register, are determined by the "pat" parameter. If the instruction is executed four times with the same base address and destination registers, but with different "pat" values, the effect is to load data from memory and to de-interleave it into the specified registers with a stride of four. The base address register can optionally be incremented by 64 on executing the final instruction in the group, to identify that 64 bytes of data have been processed.

Figures 11C, 11D:
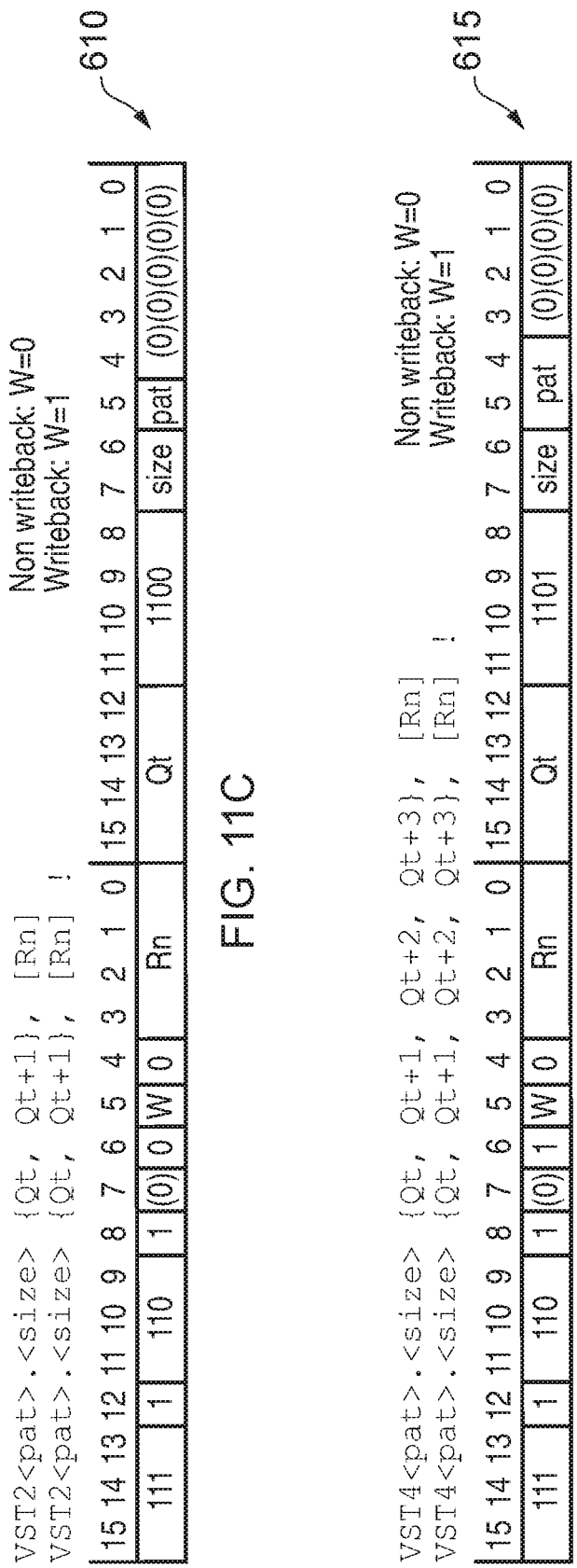

Considering the vector store instruction (VST2) of FIG. 11C, each time this instruction is executed it saves two 64-bit contiguous blocks of data to memory made up of multiple parts of two source registers. The parts of the source registers read from, and the offsets from the base address register are determined by the "pat" parameter. If the instruction is executed two times with the same base address and source registers, but with different "pat" values, the effect is to interleave the data from the specified registers with a stride of two and to save the resultant data to memory. The base address register can optionally be incremented by 32.

When considering the VST4 instruction of FIG. 11D, this again saves two 64-bit contiguous blocks of data to memory each time it is executed, and in this instance the contiguous blocks are made up of data from multiple parts of four source registers. The parts of the source registers read from, and the offsets from the base address register, are determined by the "pat" parameter. If the instruction is executed four times with the same base address and source registers, but with different "pat" values, the effect is to interleave the data elements from the specified registers with a stride of 4 and to save the resultant data to memory. The base address register can optionally be incremented by 64.

Figure 12:
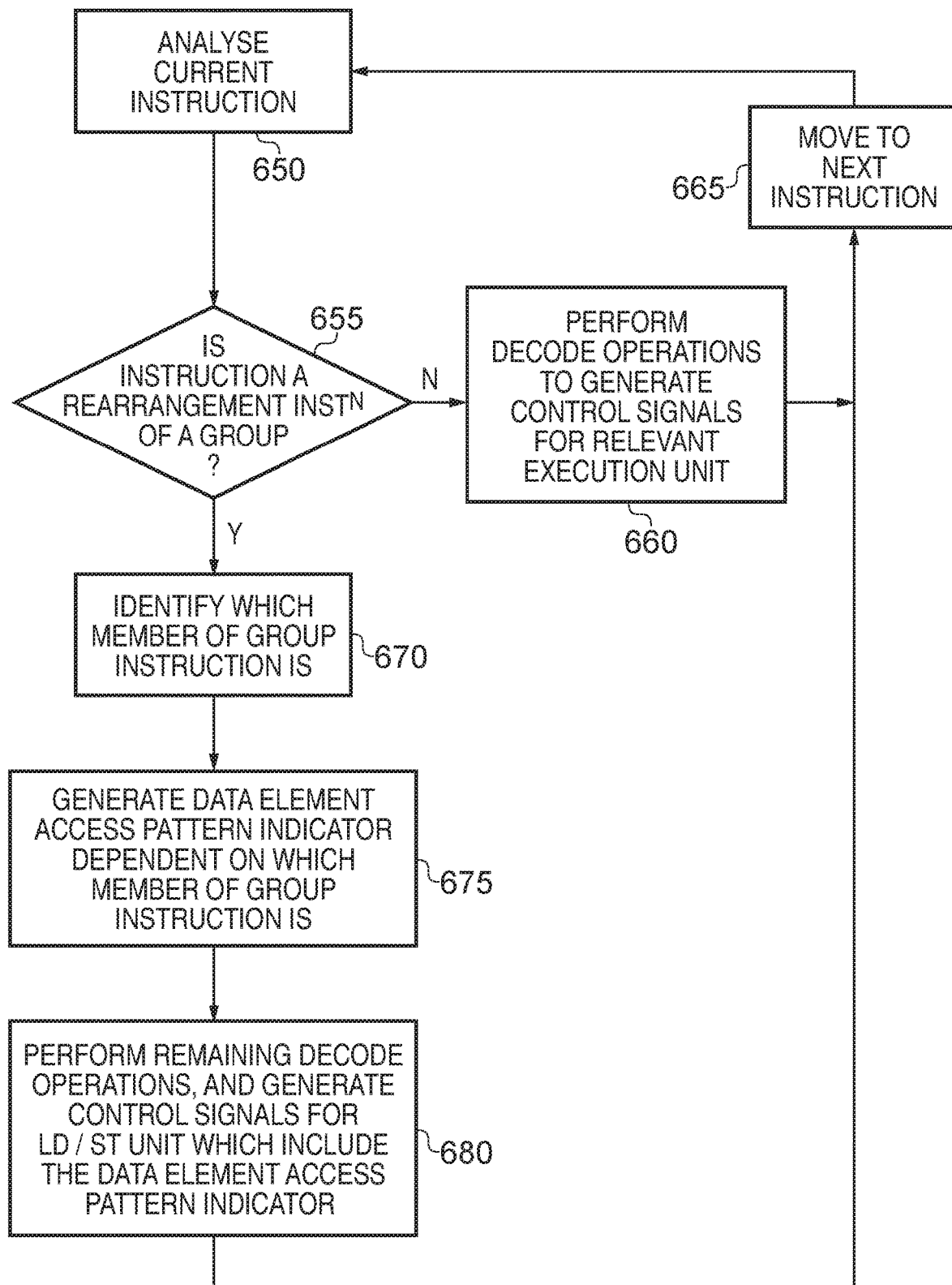
FIG. 12 is a flow diagram illustrating the operation of the instruction decoder of FIG. 1 when handling a group of rearrangement instructions in accordance with one embodiment.

FIG. 12 is a flow diagram illustrating the operation of the decoder 6 when decoding a sequence of program instructions that includes the earlier-mentioned rearrangement instructions of a group. At step 650, the current instruction is analysed whereafter at step 655 it is determined whether the instruction is a rearrangement instruction of a group. If not, then at step 660 standard decode operations are performed having regards to the instruction in order to generate control signals for the relevant execution unit, whereafter at step 665 the decoder moves to the next instruction and then returns to step 650.

If at step 655 it is determined that the current instruction being analysed is a rearrangement instruction of a group, then at step 670 it is identified which member of the group the instruction is, this being achieved by reference to the earlier-mentioned "pat" value. Thereafter, at step 675, a data element access pattern indication is generated dependent on which member of the group the instruction is and at step 680 the remaining decode operations are performed in order to generate control signals for the load store unit which include the data element access pattern indicator.

In one embodiment, as will be appreciated from the earlier discussions of FIG. 8 and FIG. 9, the data element access pattern indicator generated at step 675 can effectively merely be formed by the "pat" bits extracted from the instruction opcode, with the LSU then using this information in combination with the beat identifier (and optionally element identifier information) in order to generate the appropriate memory access and register access patterns.

Following step 680, the process then returns via step 665 to step 650.

As mentioned earlier, one or more of the instructions in the group can be arranged to update the base address in a specified base address register. In one particular embodiment, the last instruction in the group is used to perform the base address register update, and the amount by which the base address value is updated takes account of all of the accesses performed by the rearrangement instructions in the group.

Figure 13:
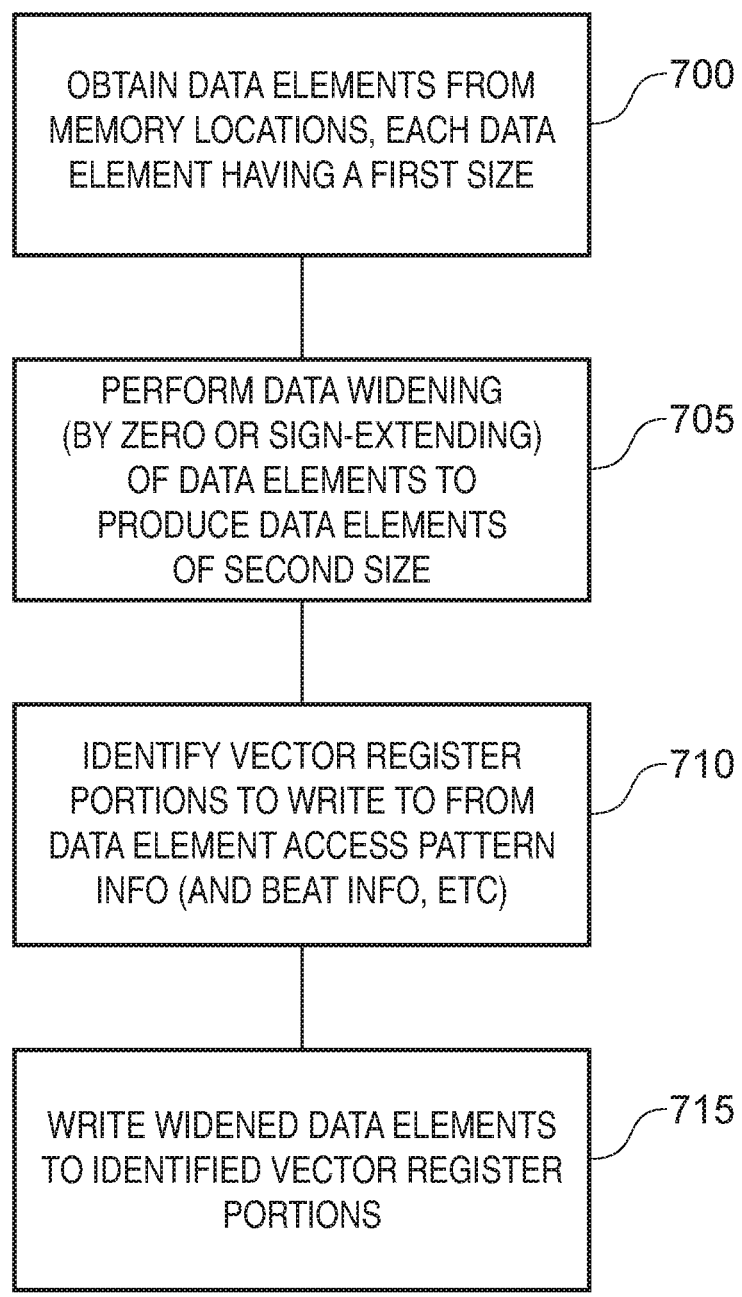
FIG. 13 illustrates a data widening operation that can be performed in accordance with one embodiment.

If desired, the operations performed when executing such load or store instructions can also be extended to include data widening or data narrowing functionality. This can be useful where the data is stored in a different format in the memory to the format in which it is stored within the vector registers. For example, it may be stored in a more truncated form in the memory than it is within the vector registers. FIG. 13 illustrates a sequence of steps that can be performed when seeking to perform data widening as data is loaded from memory into the vector registers. In particular, during each of the accesses to memory performed when executing each rearrangement instruction in the group, the process of FIG. 13 can be performed. At step 700, the relevant data elements are obtained from the memory locations, where each data element has a first size. Then, at step 705 a data widening operation is performed on those data elements (for example by zero extending or sign extending the values retrieved form memory) in order to produce data elements of a second size.

Then, at step 710 the vector register parts to be written to are determined from the data element access pattern information (and the beat information, etc, as discussed earlier with reference to FIG. 9) and then at step 715 the widened data elements are written to the identified parts of the vector registers.

It will be appreciated that an equivalent data narrowing function can be performed if desired, where instead of zero or sign extending the retrieved data, a truncation of the retrieved data elements is performed. In one embodiment the data may be widened as it is retrieved form memory into the vector registers and then narrowed when it is stored back from the vector registers to memory, whilst in an alternative embodiment the data may be narrowed as it is retrieved from memory and then widened as it is stored back to memory.

If desired, the group of rearrangement instructions can be qualified by predicate information so as to cause one or more of the data structures within the address range accessed to be excluded from processing. As will be apparent from the earlier illustrated access patterns in FIGS. 7A to 7G, when seeking to exclude one or more of the data structures from the processing, a determination as to whether this has any effect on the processing performed for any individual instruction in the group will be dependent on the access pattern. For example, if we consider the VLD4n group of instructions for which the access patterns may take the form illustrated in FIG. 7B, and it is decided to exclude from processing the data structure to be placed in the second lane, it can be seen that this will affect the first access of the VLD4n instruction that performs the access associated with the block 250 and the first access of the VLD4n instruction that is associated with the block 260. However, the other VLD4n instructions can be executed normally.

Figure 14A:
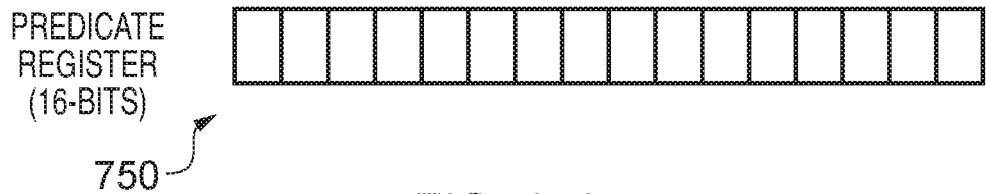
FIGS. 14A and 14B illustrate how predicate information can be used to influence the operations performed during execution of a group of rearrangement instructions in accordance with one embodiment.

In one embodiment, a predicate register 750 such as shown in FIG. 14A can be used to specify a predicate value. In one embodiment, this can be a 16-bit register, and which bits of the predicate register are used will depend on the size of the data elements. For example, when the vector registers are 128 bits wide and the data elements are 32 bits in size, there are 4 data elements per vector register, and the LSU can be arranged to refer to only every fourth bit of the predicate register 750 when assessing the predicate information, Similarly, for 16-bit data elements, it can be arranged to look at every other bit, whilst for 8-bit data elements it can be arranged to look at all bits of the predicate register. This is merely one example way of implementing the predicate information required to be referenced by the LSU, and it will be appreciated that any other way of expressing the predicate information may be used.

Figure 14B:
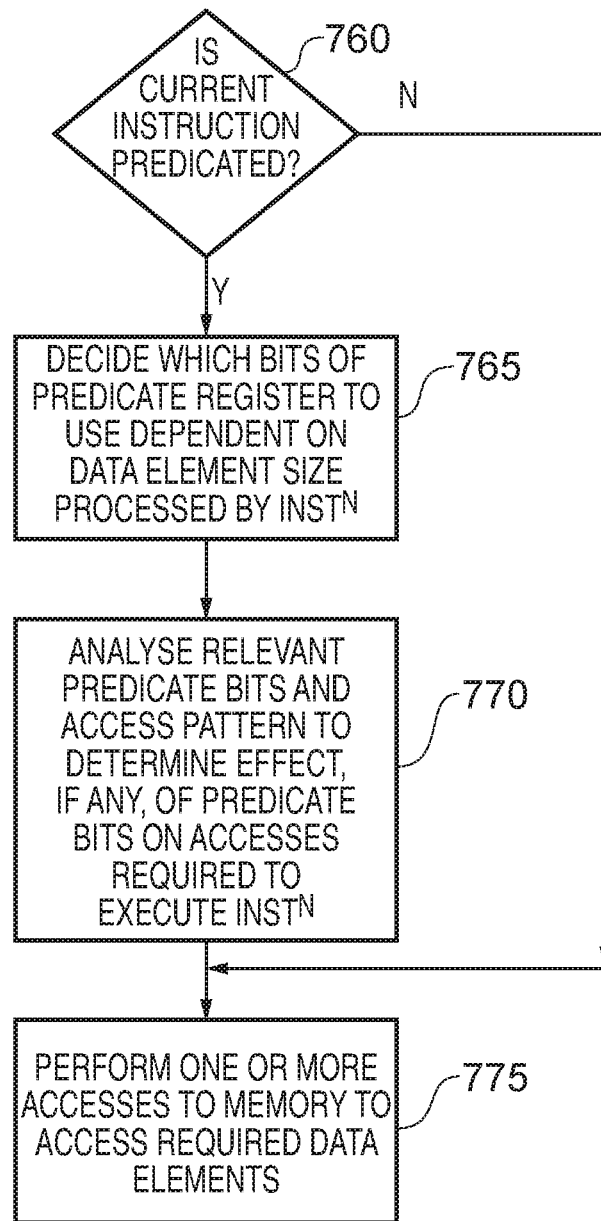

FIG. 14B is a flow diagram illustrating schematically how the predicate information is used during execution of each rearrangement instruction in the group. At step 760, it is determined whether the current instruction is predicated. In one embodiment, a separate instruction is used to set the predicate register 750, and in one embodiment that instruction also identifies that the following "M" instructions are to be predicated. Hence, as an example, such an instruction may be executed prior to a group of VLD4n instructions, identifying that those group of four VLD4n instructions are to be predicated.

If it is determined that the current instruction is not to be predicated, then the process proceeds to step 775 where the LSU performs one or more accesses to memory to access the required data elements in order to perform the required load or store operations and the associated rearrangements.

However, if at step 760 it is determined that the current instruction is predicated, then at step 765 it is decided which bits of the predicate register to use dependent on the data element size being processed by the instruction. Thereafter, at step 770 the relevant predicate bits are analysed along with the access pattern information associated with the current instruction to determine the effect, if any, of the predicate bits on the accesses that are required in order to execute the instruction. Taking the above-mentioned example discussed with reference to FIG. 7B, this will mean that when the VLD4n instruction that performs the access to the block 250 is executed it will determine that its first access is not required, and similarly when the VLD4n instruction is executed that performs the access to the block 260 it will determine that its first access is not required, assuming the predicate information is seeking to exclude from processing the data structure associated with the second lane.

Following the analysis at step 770, then at step 775 one or more accesses to memory are performed to access the required data elements. It will of course be appreciated that the predicate information could in principle mean that for one or more of the rearrangement instructions no accesses need to be performed, and accordingly in those instances no access will be performed at step 775.

From the above described embodiments, it will be appreciated that when seeking to perform rearrangement operations (such as interleave and deinterleave operations) using vector load and store instructions, the processing can be improved by using multiple separate instructions arranged in a group to implement the required rearrangement operation. In particular, such an approach can significantly reduce the likelihood of stall cycles being introduced when executing the load or store instructions. Further, by appropriately arranging the access patterns associated with each instruction, it is possible to make the instructions compatible with architectures that allow overlapped execution of memory and arithmetic instructions, hence further improving performance. By adopting the approach discussed earlier, the instructions can be readily implemented and allow efficient uses of the memory sub-system.

The following embodiments describe a novel arrangement for accessing the set of vector registers. Such an approach can be useful in a variety of situations. As one example, it can facilitate use of the various data element access patterns described earlier.

FIG. 15 schematically shows a part of a vector register file 800 with write access circuitry in accordance with one embodiment. The vector register file 800 is made up from a number of vector registers, each vector register being made up from a number of scalar registers. In the embodiment shown in FIG. 15, the part of the vector register file 800 shows parts of four vector registers 805, 810, 815, 820, represented as rows within FIG. 15. Each vector register 805, 810, 815, 820 stores a vector by using a number of scalar registers. For example, a first vector register 805 is partly made up from two scalar registers—s0 and s1, whilst a second vector register 810 is partly made up from two other scalar registers—s4 and s5. In addition to the vector register file 800, write access circuitry 830 (which is an example of register access circuitry) is provided. The write access circuitry includes a first access block 835 and a second access block 840 and will be discussed in more detail with reference to FIG. 24. Each access block is able to access a portion of a vector at a time. Accordingly, the amount of data that can be simultaneously accessed (e.g. written to) is limited. In particular, it is only possible to simultaneously write data to the vector register file 800 that is simultaneously provided at the first access block 835 and the second access block 840. In this example, for convenience, one portion is assumed to be the same size as a scalar register. In the embodiment of FIG. 15, the part of the register file 800 comprises two columns 845, 850. Each column stores a same portion of each vector. Since, in this example, the portion size is the same as the scalar register size, the columns align with the scalar registers s0, s1, s4, s5, s8, s9, s12, s13.

As shown in FIG. 15, the scalar registers are wired to one of the two ports 835, 840. In the example of FIG. 15, scalar registers s0, s5, s8, and s13 are wired to the first access block 835 whereas scalar registers s1, s4, s9, and s12 are wired to the second access block 840. It will be appreciated that from a schematic perspective, the wiring shown with reference to FIG. 15 contains a number of twists. In other words, by not merely wiring all scalar registers that are above or below each other to the same port, a logical twisting of the wiring is created. In this way, it is possible for the write access circuitry to simultaneously write to scalar registers that are in a row (i.e. part of the same vector register) such as to scalar registers s0 and s1. The same write access circuitry can also simultaneously write to scalar registers that are in the same column such as scalar registers s0 and s4. This is because the pair of scalar registers s0 and s4 and also the pair of scalar registers s0 and s1 are wired to different ports 835, 840. Note that although a twisting of the wiring is referred to here, there is no requirement that the wiring is actually physically twisted. It will be appreciate that the scalar registers themselves could be physically reordered (while renaming their logical identities/addresses) such that the wiring is straight, while producing the same effect.

A similar concept applies to read access circuitry 855, which is another example of register access circuitry as shown in FIG. 16. In this example, the read access circuitry 855 also has a first access block 860 and a second access block 865. Some of the scalar registers—s0, s5, s8, and s13 are connected to the first access block 860 whilst others—s1, s4, s9, and s12 are connected to the second access block 865. Accordingly, two of the scalar registers can be simultaneously accessed (e.g. read from) and by virtue of the twisted wiring, it is possible to read either two registers from one of the vector registers 805, 810, 815, 820 such as registers s4 and s5, or two registers that are in a same column such as registers s4 and s8. This is because registers that are in the same column alternate the access block they are connected to and also because registers in each column also alternate the access block they are connected to. Note that in the embodiments shown in FIGS. 15 and 16, although the wiring is set out in a similar manner, different physical wires are used in relation to the write access circuitry 830 of FIG. 15 and the read access circuitry 855 of FIG. 16. This is, however, not essential, and other embodiments could use exactly the same wiring for both the write access circuitry 830 and the read access circuitry 855.

FIG. 17 schematically shows a vector register file 800 with write access circuitry in accordance with one embodiment. The vector register file 800 is made up of a first section 870 with first write access circuitry 880 and a second section 875 with second write access circuitry 885. Each of the write circuitries 880, 885 only accesses portions in columns that are part of its associated section. For example, first write access circuitry 880 only accesses portions in columns in the first section 870 whilst second write access circuitry 885 only accesses portions in columns in the second section 875. It will be appreciated, therefore, that a twist does not extend across the boundary of a section.

FIG. 18 schematically shows a vector register file 800 with first read access circuitry 890 and second read access circuitry 895. As in the case of the embodiment shown in FIG. 17, the first read access circuitry 890 accesses portions in columns within the first section 870 and the second read access circuitry 895 accesses portions in columns within the second section 875.

FIG. 19A illustrates an example of single twist in a vector register file where the vector register file is illustrated in textual format showing the words. In the example of FIG. 19A, each vector comprises four portions spread across four columns. As before, each column stores the same portion of each vector. However, the labels A, B, C, and D have been provided to illustrates those portions that are accessed via the same port. Accordingly, it can be seen how the circled portions labelled A alternate between the third and fourth columns when going upwards through the vector registers from Q0 to Q7. The vector register file is said to have a single twist because the pattern of each of the portions is distributed across $2^1$, i.e. 2 columns.

FIG. 19B illustrates an example of single twist in a vector register file where the vector register file is illustrated in textual format showing the bytes. FIG. 19B corresponds with FIG. 19A, except that FIG. 19B illustrates the vector register file in byte format. In particular, it is shown that each word is made up of four bytes (i.e. each word is 32 bits). The four bytes that make up each word are illustrates by adding a numbered suffix to the end of each label. For example, words labelled A are made up from bytes labelled A0, A1, A2, and A3. Again, the single twist pattern is illustrates by circling all the bytes that make up the A words. It can be seen, again, that the pattern is distributed across 2 columns.

In some cases, it may be necessary to provide a wider range of access patterns for the vector register file. For example, if a vector comprises 8 data elements, each of 16-bits, then each vector will be 128-bit. Accordingly, for two sections, each section will be 64-bit. It will therefore be necessary for each accessed portion of each vector to be 16-bits, and so there will have to be 64/16=4 columns provided in each section. In order to make it possible to simultaneously access portions from the same column and for the same circuitry to be able to simultaneously access portions from the same quotient register, it is necessary to provide more than a single twist. In particular, it will be necessary to provide a first 16-bit twist pattern nested within a second 32-bit twist pattern.

FIG. 20 illustrates one such pattern, which despite using a total of 8 columns (4 per section) as opposed to the total of 4 columns (2 per section) shown in FIG. 19B, uses the same labelling as FIG. 19B for convenience. The example of FIG. 20 illustrates the first 32-bit twist pattern with an ellipse, which covers all of the A elements and alternates between columns 1+2 and columns 3+4. The 16-bit twist pattern (shown by rectangles) is more complex and represents the connections that would be made to one of the ports of read or write access circuitry. In particular, for the two pairs of columns within each ellipse, the access circuitry alternates between connecting the left pair and the right pair every 2 vector registers. For example, at vector register Q0, the right pair of the right ellipse is connected. This alternates with the left pair of the right ellipse after 2 more vector registers (i.e. at vector register Q2). After a further 2 registers (i.e. at vector register Q4), the right pair of the right ellipse is accessed again. A similar pattern occurs with respect to the left ellipse. In particular, at vector register Q1, the right pair of the left ellipse is connected, and this alternates after a further 2 registers (i.e. at vector register Q3) such that the left pair of the left ellipse is connected. Once again, this alternates back to the right pair of the left ellipse after a further 2 vector registers (i.e. at vector register Q5). Viewed alternatively, columns 1, 3, 2, and 4 (counting columns from right to left) are accessed across vector registers Q0 to Q3 by one of the ports of the access circuitry. In other words, the access block accesses a different column within each section across each of the vector registers Q0 to Q3. After vector register Q3, the pattern repeats.

It will be appreciated that for each column within a section, the number of vector registers that must be "passed through" before the wiring pattern repeats is equal to the number of columns.

Note that in FIG. 20, it is also clear that the "twisting size", i.e. the size of portion that is subject to the twisting, could differ from the data element size. This is because, having produced a vector register file with a particular arrangement of wiring, the degree of twisting that can occur (and the number of columns) becomes fixed. At that point, the vector register file becomes agnostic to the size of the data elements. In particular if the portion sizes are 16-bits, as is the case in FIG. 20, the same register file could be used to store 16-bit data elements or 32-bit data elements again as is the case in FIG. 20.

FIG. 21 schematically shows one section of a vector register file 900 in which the circuitry performs a double twist in accordance with one embodiment. For example, the schematic of FIG. 21 may correspond with the double twist pattern illustrates in FIG. 20. In the embodiment shown in FIG. 21, the vector registers are made up of a plurality of scalar registers s0, s1, s4, s5, s8, s9, s12, s13, each of 32-bits. However, the size of each portion is 16-bits. Consequently, each of the scalar registers stores two portions and the section shown in FIG. 21 comprises four columns. The embodiment shown in FIG. 21 illustrates four differently stylised lines 905, 910, 915, 920. Each of the lines 905, 910, 915, 920 represents a wiring or those portions that are connected to a same access block of the access circuitry. It will be noted that one of the lines 905 corresponds with the connection pattern shown with respect to FIG. 20. That particular line connects to columns 1, 3, 2, and 4 (from right to left) in vector registers Q0, Q1, Q2, and Q3 respectively (from bottom to top). As shown above the top vector register (Q3) of FIG. 21, after four vector registers, the access pattern of each line repeats itself.

It has been shown how a single twist pattern and a double twist pattern can be implemented, in order to wire those portions of vector registers that do not have to be accessed simultaneously to the same access block of register access circuitry, thereby making it possible to simultaneously access portions in a row or column. However, the concept of nested twist patterns can be extended infinitely. For example, by adding a third level of nested twisting—resulting in a doubling of the number of portions/columns, it is possible to simultaneously access $2^3$=8 8-bit portions within a single section in either a column or a row.

FIG. 22 is a diagram that illustrates how the process of performing a twist can be generalised to perform nested twisting an arbitrary number of times in accordance with one embodiment. FIG. 22 illustrates part of a register file 925. A single vector register 930 comprising scalar registers s0, s1, s2, and s3 is shown. The register file comprises two sections 935, 940 each comprising 8 columns. However, the same principle can be applied to a single section. The columns can be thought of as being logically grouped together in a nested structure. The nested structure has $\log_2(N)$ levels, where N is the number of columns within a section. In this case, therefore, the nested structure has $\log_2(8)$=3 levels 945, 950, 955. The number of levels also corresponds with the depth of nesting. In this particular example, therefore, the nesting will be 3 levels deep. At a first level 945, the N=8 columns are split equally between a first set of at least one columns 980 and a second set of at least one columns 985. Together, these form a combined group 980, 985 at the first level 945. Each of the sets at each parent level (e.g. at a second level 950), are equally split into a first set of at least one columns and a second set of at least one columns for a corresponding child level (e.g. at a third level 955). For example, in FIG. 22, at a parent level 950, one of the sets of at least one columns 970 is split into a first set of at least one columns 960 and a second set of at least one columns 965 in the child level 955. The number of combined groups at a given level L is equal to $2^L$. The same splitting process is therefore true of other sets in the parent level.

It will be appreciated that the levels 945, 950, and 955 are entirely conceptual and merely used for the purposes of grouping the columns in increasingly large (or decreasingly smaller) sets.

With this structure in place, it is possible to describe the wiring between an access block of the access circuitry (described in the following figures) and the different portions of the vector registers. Each access block is configured, for each vector register, to visit one column. The one column that is visited for that access block/vector register combination is uniquely identifiable by the requirement or constraint that at each level, the first sets of at least one columns are visited for half a predetermined number of vector registers before visiting the second set of at least one columns for the same number of vector registers. The predetermined number is equal to $2^X$ and where X is different at each level and is in the range 1 to $\log_2(N)$. The predetermined number is therefore in the range 2-8. Therefore, each access block visits, for example, 1-4 columns in the first set(s) 980 before visiting the same number of columns in the second set(s) 985. The same is also true for the two first sets and two second sets in the second level 950 and for the four first sets and four second sets in the third level 955.

The combined group 970,975 shown in FIG. 22 is made up from a first set of columns 970 and a second set of columns 975 and occurs at a second level of the nested structure. Therefore, in one example, across four vector registers, one access block could access column 960, followed by column 965, followed by two columns in combined group 975. In a second example, one access block could access column 960 followed by one of the columns in combined group 975, followed by column 965, followed by the other column in combined group 975. Each column is only visited by a single access block for a single vector register, therefore in the first example, another access block could access two different columns in combined group 975, followed by column 960, followed by column 965.

In one wiring example, each access block in a section visits a column from a first set and within another $2^{M-1}$ vector registers, visits a column from the corresponding second set, where M is the given level. For example, when a first access block visits a column from a first set 980 of the first level 945, within $2^{1-1}=1$ vector registers, a column in the corresponding second set 985 of the first level 945 will be visited. In other words, across each vector register, the access block will alternate between columns in the first set 980 and the second set 985. Similarly, at a second level 950, after visiting a column in the first set 970, within $2^{2-1}=2$ vector registers, a column in the corresponding second set 975 will be visited.

Accordingly, it can be seen how a wiring pattern can be produced for arbitrary depths of nesting.

FIG. 23 schematically shows read access circuitry or read port as an example of register access circuitry in accordance with one embodiment. In the embodiment shown in FIG. 23, the read access circuitry comprises four access blocks 990, 995, 1000, 1005 in a first section and alternative access blocks 990', 995', 1000', 1005' in a second section. Each access block is implemented as a multiplexer. The presence of four access blocks per section indicates that such circuitry would be used where there are four columns in a section. In other words, such circuitry would be used where double nesting occurs, such as the register file 900 shown in FIG. 21. Each of the access blocks in a section is connected to a plurality of portions across the vector registers in that section as previously described. It will be appreciated that where twisting occurs, the order in which the portions are output could be inverted. For example, with reference to FIG. 18, when accessing vector register Q0, the portions will come out in the order s3, s2, s1, s0 (i.e. descending order). However, when accessing vector register Q1, the portions will come out in the order s6, s7, s4, s5 (non-descending order). In order to rectify this, a crossbar multiplexer 1010 (which is an example of rearrangement circuitry) is provided in each section, which is able to reorder the outputs of the access blocks 990, 995, 1000, 1005 of that section. The outputs from the crossbar multiplexer 1010 are then provided to both a further multiplexer 1015, which makes it possible to provide a scalar value. The outputs are also merged together and provided at a group read port, which makes it possible to read all four selected values (i.e. from a column or row).

FIG. 24 schematically shows write access circuitry as an example of register access circuitry in accordance with one embodiment. As with the read circuitry shown in FIG. 23, the write circuitry shown in FIG. 24 has a similar problem with regard to re-ordering of portions. In particular, the portions may be provided to the vector register file 900 in one order, but may have to be reordered as a consequence of the wiring described earlier. In order to compensate for this, a crossbar multiplexer 1020 (an example of rearrangement circuitry) is provided in order to rearrange the inputs prior to being written to the vector register file 900.

FIG. 25 is of a flow chart 1025 that illustrates a method of manufacturing in accordance with one embodiment. In a first step 1030, a set of vector registers is provided. Each of the vector registers is arranged to store a vector comprising a plurality of portions. In a second step 1035, register access circuitry for each section of the vector registers is provided. In a third step 1040, each of the access blocks is arranged to access portions of the vector registers in a different column when accessing one of the vector registers than when accessing at least one of the other vector registers. Consequently, the register access circuitry is arranged to simultaneously access portions of the vector registers in either the vector registers or the columns.

FIG. 26 illustrates a virtual machine implementation that may be used. Whilst the earlier described embodiments implement the invention in terms of apparatus and methods for operating specific processing hardware supporting the techniques concerned, it is also possible to provide so-called virtual machine implementations of hardware devices. These virtual machine implementations run on a host processor 1500 running a host operating system 1400 supporting a virtual machine program 1300. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 1300 provides a virtual hardware interface to a guest program 1200 which is the same as the hardware interface which would be provided by the real hardware which is the device being modelled by the virtual machine program 1300. Thus, the program instructions, including the rearrangement instructions described above, may be executed from within the guest program 1200 using the virtual machine program 1300 to model their interaction with the virtual machine hardware. The guest program 1200 may be a bare metal program, or alternatively it may be a guest operating system that runs applications in a similar way to how Host OS 1400 runs the virtual machine application 1300. It will also be appreciated that there are different types of virtual machine, and in some types the virtual machine runs directly on the host hardware 1500 without the need for a host OS 1400.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus, comprising:
a set of vector registers, each of the vector registers being arranged to store a vector comprising a plurality of portions, the set of vector registers being logically divided into a plurality of columns such that each vector is distributed across more than one of the columns with each of the columns being arranged to store portions of the vectors whose positions in their vector is the same; and
register access circuitry to access each of the portions, the register access circuitry comprising a plurality of access blocks each capable of accessing a subset of the portions, wherein
the subset of the portions that are accessible by each access block comprise portions in different columns and different vector registers; and
the register access circuitry is arranged to simultaneously access a plurality of accessed portions in any one of: one of the vector registers and one of the columns.

2. An apparatus according to claim 1, wherein
the set of vector registers comprises at least one section, where each section comprises different columns; and
the apparatus comprises register access circuitry for each section, each register access circuitry arranged to access portions in the section associated with that register access circuitry.

3. An apparatus according to claim 2, wherein
each access block is arranged to access a portion in a different column when accessing one of the vector registers than when accessing a number of other vector registers equal to the number of columns comprised within each section minus one.

4. An apparatus according to claim 2, wherein
each section is logically divided into N columns;
the N columns are logically arranged into a nested structure having $\log_2(N)$ levels, where N is greater or equal to 4 and an integer power of 2;
at a first level, the N columns are split equally between a first set of at least one columns for the first level and a second set of at least one columns for the first level;
each of the sets of at least one columns in each parent level is equally split again into a first set of at least one columns for a corresponding child level and a second set of at least one columns for that corresponding child level;
each of the access blocks is configured, for each vector register, to visit one column, the one column being uniquely identified by the constraints of visiting, for each level, the first sets of at least one columns for half a predetermined number of vector registers before visiting the second sets of at least one columns for half a predetermined number of vector registers; and
the predetermined number is equal to $2^X$, where X is different at each level and is in the range 1 to $\log_2(N)$.

5. An apparatus according to claim 4, wherein
the set of vector registers comprises 2 sections; and
N has the value 4.

6. An apparatus according to claim 1, wherein
a first access block is arranged to access a first column of a first vector register and to access a second column of a second vector register; and a second access block is arranged to access the second column of the first vector register and to access the first column of the second vector register.

7. An apparatus according to claim 1, wherein
the register access circuitry comprises read access circuitry to output data elements stored in the vector registers; and
the register access circuitry comprises write access circuitry to input data elements to the vector registers.

8. An apparatus according to claim 7, wherein
the read access circuitry comprises one access block for each of the plurality of columns.

9. An apparatus according to claim 7, wherein
the read access circuitry comprises at most one access block for each of the plurality of columns.

10. An apparatus according to claim 7, wherein
the access blocks in the read access circuitry comprise multiplexers.

11. An apparatus according to claim 7, wherein
the set of vector registers comprises at least one section, where each section comprises different columns;
the apparatus comprises register access circuitry for each section, each register access circuitry being arranged to access portions in the section associated with that register access circuitry; and
for each section the read access circuitry comprises rearrangement circuitry to rearrange outputs from each of the access blocks in the read access circuitry.

12. An apparatus according to claim 11, wherein
the rearrangement circuitry is a crossbar multiplexer.

13. An apparatus according to claim 12, wherein the write access circuitry comprises at most one access block for each of the plurality of columns.

14. An apparatus according to claim 7, wherein the write access circuitry comprises one access block for each of the plurality of columns.

15. An apparatus according to claim 14, wherein the set of vector registers comprises at least one section, where each section comprises different columns;

the apparatus comprises register access circuitry for each section, each register access circuitry being arranged to access portions in the section associated with that register access circuitry; and for each section the write access circuitry comprises rearrangement circuitry to rearrange inputs to each of the access blocks in the write access circuitry.

16. An apparatus according to claim 15, wherein the rearrangement circuitry is a crossbar multiplexer.

17. An apparatus according to claim 1, wherein the vector registers are 128-bit registers.

18. An apparatus according to claim 1, wherein each of the vector registers comprises a plurality of 32-bit registers.

19. A method comprising:

providing a set of vector registers, each of the vector registers being arranged to store a vector comprising a plurality of portions, the set of vector registers being logically divided into a plurality of columns such that each vector is distributed across more than one of the columns with each of the columns being arranged to store portions of the vectors whose positions in the vector is the same; and providing register access circuitry to access each of the portions, the register access circuitry comprising a plurality of access blocks each capable of accessing a subset of the portions, wherein the subset of the portions that are accessible by each access block comprise portions in different columns and different vector registers; and the register access circuitry is arranged to simultaneously access a plurality of accessed portions in any one of: one of the vector registers and one of the columns.

* * * * *